United States Patent
Ishizeki et al.

(10) Patent No.: US 10,128,720 B2
(45) Date of Patent: Nov. 13, 2018

(54) ELECTRIC MOTOR AND ELECTRIC PUMP

(71) Applicant: Mitsuba Corporation, Kiryu-shi, Gunma (JP)

(72) Inventors: Masaki Ishizeki, Kiryu (JP); Yoichi Shindo, Kiryu (JP); Shinji Shibuya, Kiryu (JP); Ken Hirota, Kiryu (JP); Atsushi Takahashi, Kiryu (JP); Yuzuru Masuyama, Kiryu (JP); Tomoo Iijima, Kiryu (JP); Ken Yamamoto, Kiryu (JP); Nobuyasu Sadakata, Kiryu (JP); Shigeyuki Enkaku, Kiryu (JP)

(73) Assignee: Mitsuba Corporation, Gunma (JP)

( * ) Notice: Subject to any disclaimer, the term of this patent is extended or adjusted under 35 U.S.C. 154(b) by 542 days.

(21) Appl. No.: 14/655,480

(22) PCT Filed: Dec. 25, 2013

(86) PCT No.: PCT/JP2013/084724
§ 371 (c)(1),
(2) Date: Jun. 25, 2015

(87) PCT Pub. No.: WO2014/104121
PCT Pub. Date: Jul. 3, 2014

(65) Prior Publication Data
US 2015/0357886 A1 Dec. 10, 2015

(30) Foreign Application Priority Data

Dec. 28, 2012 (JP) .................................. 2012-288315
Dec. 28, 2012 (JP) .................................. 2012-288316
(Continued)

(51) Int. Cl.
*H02K 5/22* (2006.01)
*F04D 25/06* (2006.01)
(Continued)

(52) U.S. Cl.
CPC ............. *H02K 5/225* (2013.01); *F04C 2/102* (2013.01); *F04C 11/008* (2013.01);
(Continued)

(58) Field of Classification Search
CPC ..... F04D 25/06; H01R 13/73; H01R 13/5202; H02K 5/22; H02K 11/024; H02K 5/225;
(Continued)

(56) References Cited

FOREIGN PATENT DOCUMENTS

| JP | 03071982 A | 3/1991 |
|---|---|---|
| JP | 10137947 A | 5/1998 |

(Continued)

OTHER PUBLICATIONS

Japanese Patent Office; Search Report in International Patent Application No. PCT/JP2013/084724 dated Apr. 8, 2014; 4 pages.
(Continued)

*Primary Examiner* — Mohamad Musleh
(74) *Attorney, Agent, or Firm* — Wood Herron & Evans LLP

(57) ABSTRACT

This electric motor includes: a brushless motor (20); and a control device (50) that is coupled integrally to an end of a motor case (11) in an axial direction. The control device (50) includes: a bus bar unit main body (53) that has a base unit (54) with a plurality of bus bars wired thereinside and has a connector unit (58) provided integrally on the base unit (54) and led out to an outside of a housing (10); a motor drive unit (66) that drives the brushless motor (20); and a motor control unit (71) that controls the motor drive unit (66). The motor drive unit (66) is attached to a first main surface (51) of the base unit (54) while the motor control unit (71) is attached to a second main surface (52) of the base unit (54).

17 Claims, 16 Drawing Sheets

(30) Foreign Application Priority Data

| Date | | | |
|---|---|---|---|
| Jan. 11, 2013 | (JP) | ................................. | 2013-003792 |
| Sep. 30, 2013 | (JP) | ................................. | 2013-204809 |
| Nov. 22, 2013 | (JP) | ................................. | 2013-242063 |
| Nov. 26, 2013 | (JP) | ................................. | 2013-243926 |
| Nov. 26, 2013 | (JP) | ................................. | 2013-244297 |

(51) Int. Cl.
  *H01R 13/52* (2006.01)
  *H01R 13/73* (2006.01)
  *H02K 11/02* (2016.01)
  *H02K 11/33* (2016.01)
  *F04C 15/00* (2006.01)
  *F04C 2/10* (2006.01)
  *F04C 11/00* (2006.01)
  *F01C 21/10* (2006.01)

(52) U.S. Cl.
  CPC ............ *F04C 15/008* (2013.01); *F04D 25/06* (2013.01); *H01R 13/5202* (2013.01); *H01R 13/73* (2013.01); *H02K 5/22* (2013.01); *H02K 11/024* (2013.01); *H02K 11/33* (2016.01); *F01C 21/10* (2013.01); *F04C 2240/803* (2013.01); *F04C 2240/808* (2013.01)

(58) Field of Classification Search
  CPC ..... H02K 11/0073; H02K 11/33; F01C 21/10; F04C 2240/803; F04C 2240/808; F04C 2/102; F04C 11/008; F04C 15/008
  See application file for complete search history.

(56) References Cited

FOREIGN PATENT DOCUMENTS

| JP | 2004222354 A | 8/2004 |
|---|---|---|
| JP | 2004-353536 A | 12/2004 |
| JP | 2007185055 A | 7/2007 |
| JP | 2007306671 A | 11/2007 |
| JP | 2008110357 A | 5/2008 |
| JP | 2008271701 A | 11/2008 |
| JP | 2009232554 A | 10/2009 |
| JP | 2010263697 A | 11/2010 |
| JP | 2012-092742 A | 5/2012 |
| JP | 2012095476 A | 5/2012 |
| JP | 2012110177 A | 6/2012 |
| JP | 2012241565 A | 12/2012 |
| JP | 2013074229 A | 4/2013 |
| WO | 2013038572 A1 | 3/2015 |

OTHER PUBLICATIONS

Japanese Patent Office, Office Action issued in Japanese Patent Application No. 2013-243926 dated Jul. 25, 2017, 6 pages.
Japanese Patent Office, Office Action issued in Japanese Patent Application No. 2013-244297 dated Sep. 5, 2017, 8 pages.
Japanese Patent Office, Notice of Allowance issued in Japanese Patent Application No. 2013-244297 dated Dec. 19, 2017, 6 pages.

ELECTRIC MOTOR AND ELECTRIC PUMP

TECHNICAL FIELD

This invention relates to an electric motor and an electric pump.

The present application claims priority based on: Japanese Patent Application No. 2012-288316 filed on Dec. 28, 2012; Japanese Patent Application No. 2012-288315 filed on Dec. 28, 2012; Japanese Patent Application No. 2013-204809 filed on Sep. 30, 2013; Japanese Patent Application No. 2013-003792 filed on Jan. 11, 2013; Japanese Patent Application No. 2013-242063 filed on Nov. 22, 2013; Japanese Patent Application No. 2013-244297 filed on Nov. 26, 2013; and Japanese Patent Application No. 2013-243926 filed on Nov. 26, 2013, the contents of which are incorporated herein by reference.

BACKGROUND

An electric pump provided with an electric motor is used to pneumatically send oil to, for example, a drive motor in an electric automobile or a hybrid motor vehicle, or to a gearbox or the like connected to the drive motor.

Patent Document 1 discloses an electric pump in which a pump rotor of a pump unit is fixed to a first end of a rotation shaft rotatably supported in a housing and a rotor of an electric motor is fixed to a second end of the rotation shaft, wherein a driver unit that operates the electric motor is contained in an accommodation space recessed in an end surface of the housing and is then covered with a cover.

The driver unit is made by attaching many parts to a substrate. Of the many parts attached to the substrate, large parts of the driver unit such as a capacitor is arranged on the substrate so as to be located in the recess of the accommodation space.

In the housing, there is erected a connector unit for supplying electric power to the driver unit. The connector unit is made of: a connection terminal that extends through the housing, a first end of the connection terminal being connected to the driver unit inside the housing and a second end thereof being exposed to an outside via a through-hole of the housing; and a connector main body that surrounds the second end of the connection terminal.

To the connector unit, a harness led out from an external power source is connected. As a result, the external power source outside the housing and the driver unit inside the housing is electrically connected via the connection terminal of the connector unit, causing the electric power to be supplied from the external power source to the driver unit.

Patent Document 2 discloses an electric pump including: a pump unit; a motor unit that drives the pump unit; a conductive motor housing that contains at least the motor unit; and a driver unit (corresponding to the "control device" in the claims) that controls the motor unit.

From an opening formed in an end face of the motor housing, a terminal unit (corresponding to the "motor electricity-supplying terminal" in the claims) for electrically connecting between a coil of the motor unit and a substrate in the driver unit protrudes toward the driver unit. Into a mount of the driver unit, a terminal bent into a U-shape is buried by insertion molding. Of the U-shaped terminal, a first end is used as a terminal to be connected to the substrate while a second end is used as a connection section with a protrusion that is brought into contact with the terminal unit when assembled. In the mount of the driver unit, a through-hole into which the terminal unit is to be inserted is formed.

When the driver ASSY is fixed to the motor housing, the terminal unit is inserted through the through-hole into contact with the protrusion of the U-shaped terminal. This allows an electric current to pass from the substrate to the coil.

Thus, according to Patent Document 2, only inserting the terminal unit into the through-hole allows the terminal unit of the motor unit and the U-shaped terminal of the driver unit to be electrically connected. Therefore, this is expected to simplify the manufacturing steps.

Incidentally, there are cases where an electric pump is installed and used in an environment exposable to water such as in an engine room or in the vicinity of a gearbox of a motor vehicle. Therefore, an electric motor and an electric pump may require waterproofness.

Because an electric pump is mounted, for example, in an engine room or in the vicinity of a gearbox of a motor vehicle, there are cases where the layout is restricted. Therefore, an electric motor and an electric pump are required to be made smaller.

For example, as is described in Patent Document 1, there are cases where a brushless motor is used as this electric motor. A control device for operating the brushless motor is roughly made of: a driver unit (corresponding to the "motor drive unit" in the claims); and a control unit (corresponding to the "motor control unit" in the claims). Therefore, for containing the control device in an accommodation space of a housing with a limited size, it is necessary to take the layoutability of the driver unit and the control unit into consideration.

In the structure of Patent Document 2, it is necessary to mechanically join the terminal unit of the motor unit and the U-shaped terminal of the driver unit together by, for example, welding or the like in order to further improve the reliability of the electric connection. A variety of welding methods are available. However, generally speaking, in order to connect terminals that overlap each other, resistance welding such as projection welding or spot welding is preferable. Resistance welding is performed in this manner. A main electrode bar and a sub electrode bar are brought into contact respectively with the two terminals in the direction in which the two terminals overlap each other. While pressure is being applied to the bars, electric power is passed between the main electrode bar and the sub electrode bar via the two terminals.

RELATED ART DOCUMENT

Patent Document

[Patent Document 1] Japanese Unexamined Patent Application, First Publication No. 2004-353536

[Patent Document 2] Japanese Unexamined Patent Application, First Publication No. 2012-92742

SUMMARY

Problems to be Solved by the Invention

In the prior art, it has been described only that large parts such as a capacitor are to be contained within a recess section in the accommodation space. The positional relationship among the parts that constitute the control device such as the motor drive unit that drives the motor unit, the motor control unit that controls the motor drive unit, the noise prevention elements, and the connector unit has not been specifically described. Therefore, the electric motors and the electric pumps in the prior art allow for further downsizing.

In the electric motors and the electric pumps in the prior art, the joint section between the housing and the cover may allow water to infiltrate. Therefore, a desired means of waterproofing this site is required. On the other hand, the connection terminal already connected to the driver unit is configured to extend to the outside of the housing through the through-hole of the connector unit. This makes it possible for water to infiltrate into the housing through the gap between the connection terminal of the connector unit and the housing. Accordingly, it may not be possible to ensure the waterproofness of the electric motor and the electric pump.

Furthermore, in the prior art, the constituent parts of the driver unit such as a substrate are arranged behind the U-shaped terminal when seen in the direction in which the two terminals overlap each other. This makes it difficult, at the time of resistance welding, to bring the main electrode bar or the sub electrode bar into contact with the U-shaped terminal from behind the U-shaped terminal. In addition, using a special-shaped electrode bar that can be arranged between the U-shaped terminal and the constituent parts of the driver unit may be conceived. However, this electrode bar is more costly than a general-purpose electrode bar, resulting in higher manufacturing costs. In addition, it is necessary to insert the electrode bar into a small space. This may have an influence on the workability at the time of resistance welding.

The present invention provides a downsizable electric motor and an electric pump provided with the electric motor.

Furthermore, the present invention provides: an electric motor that is capable of preventing water from infiltrating from a connector unit into a housing and is capable of ensuring waterproofness; and an electric pump provided with the electric motor.

Furthermore, the present invention provides: an electric motor that is capable of improving workability at the time of resistance welding; and an electric pump provide with the electric motor.

Means for Solving the Problem

According to a first aspect of the present invention, an electric motor includes: a motor unit including a stator and a rotor, the stator being provided inside a motor case constituting a part of a housing, and the rotor being pivotally supported in a rotatable manner inside the stator in a radial direction; and a control device that is coupled integrally to an end of the motor case in an axial direction. The control device includes: a bus bar unit main body that has a base unit with a plurality of bus bars wired thereinside and has a connector unit provided integrally on the base unit; a motor drive unit that drives the motor unit; and a motor control unit that controls the motor drive unit. The motor drive unit is attached to a first surface of the base unit in the axial direction, and the motor control unit is attached to a second surface of the base unit in the axial direction.

According to this structure, the motor drive unit is attached to the first surface of the base unit, and the motor control unit is attached to the second surface of the base unit. Therefore, it is possible to make the first surface and the second surface of the base unit smaller in area, and hence, to make the external shape of the base unit smaller than the case where the motor drive unit and the motor control unit are attached to only either one of the first surface and the second surface of the base unit. Furthermore, a plurality of bus bars are wired inside the base unit. Therefore, it is possible to make the external shape of the base unit smaller and make the base unit thinner than the case where, in the first surface and the second surface of the base unit, the bus bars are wired while circumventing the motor drive unit and the motor control unit. Accordingly, it is possible to make the electric motor smaller in the axial direction and the radial direction.

According to a second aspect of the present invention, the housing has a through-hole provided at a position corresponding to the connector unit. The connector unit is provided integrally on either one of the first surface and the second surface of the base unit, and is also erected along the axial direction and is led out to an outside of the housing through the through-hole.

According to this structure, the connector unit is provided integrally on either one of the first surface and the second surface of the base unit, and is also erected along the axial direction. Therefore, it is possible to arrange the connector unit while the bus bar unit main body is being prevented from becoming larger in the radial direction. Accordingly, it is possible to make the electric motor further smaller in the radial direction.

According to a third aspect of the present invention, In the base unit, a seal face is formed around a base end of the connector unit; the connector unit is let out to the outside of the housing through the through-hole; and between the seal face and the housing, a sealing member arranged annularly around the connector unit is sandwiched.

According to this structure, the connector unit is led out to the outside of the housing through the through-hole, and the sealing member annularly arranged around the connector unit is sandwiched between the seal face and the housing. Therefore, it is possible to prevent the water, which has infiltrated from a gap between the connector unit and the through-hole, from moving outer than the sealing member. Consequently, it is possible to prevent water from infiltrating from the connector unit into the housing, and to ensure the waterproofness of the electric motor.

According to a fourth aspect of the present invention, on an outside of the sealing member of the base unit, fixation devices for fixing the bus bar unit main body to the housing are provided, and the fixation devices are uniformly arranged around the connector unit.

According to this structure, the fixation devices for fixing the bus bar unit main body to the housing are uniformly arranged around the connector unit. Therefore, when the bus bar unit main body is fixed to the housing, it is possible to sandwich the sealing member, which is interposed between the housing and the seal face of the base unit, between the housing and the base unit, in a state of being uniformly pressed around the connector unit. Consequently, it is possible to securely prevent water from infiltrating from the connector unit into the housing, and to ensure high waterproofness of the electric motor.

According to a fifth aspect of the present invention, in the electric motor, a noise prevention element that constitutes the control device may be provided on a surface opposite to the connector unit across the base unit.

According to this structure, the space above the surface on the side opposite to the connector unit across the base unit is a dead space. This dead space can be effectively utilized by providing thereon a noise prevention element. Consequently, it is possible to prevent the electric motor from being made larger when the noise prevention element is provided to the bus bar unit main body.

According to a sixth aspect of the present invention, at an end of the motor case on a first side in the axial direction, a control device disposition section for attachment of the control device is provided. A cover member, which constitutes a part of the housing and covers the control device disposition section from the first side in the axial direction, is included. On the control device disposition section, a flange section that extends externally in the radial direction is provided. The connector unit is erected along the axial direction from the second surface of the base unit in the axial direction. In the flange section, the through-hole is formed, and the connector unit is led out to the outside of the housing through the through-hole.

According to this structure, the connector unit is erected along the axial direction from the second surface of the base unit in the axial direction. Therefore, it is possible to arrange the connector unit while the bus bar unit main body is prevented from becoming larger in the radial direction. At this time, the opening of the connector unit faces in the second direction in the axial direction. This allows a harness, which is led out from an external power source, to be connected to the connector unit from the second side in the axial direction. Consequently, it is possible to prevent the interference between the connector unit and the peripheral equipment.

According to a seventh aspect of the present invention, at an end of the motor case on a first side in the axial direction, a control device disposition section for attachment of the control device is provided. A cover member, which constitutes a part of the housing and covers the control device disposition section from the first side in the axial direction, is included. The connector unit is erected along the axial direction from the first surface of the base unit in the axial direction. In the cover member, the through-hole is formed. The connector unit is led out to the outside of the housing through the through-hole.

According to this structure, the connector unit is erected along the axial direction from the first surface of the base unit in the axial direction. Therefore, it is possible to arrange the connector unit while the bus bar unit main body is prevented from becoming larger in the radial direction. At this time, the opening of the connector unit faces in the first direction in the axial direction. This allows a harness, which is led out from an external power source, to be connected to the connector unit from the first side in the axial direction. Consequently, it is possible to prevent the interference between the connector unit and the peripheral equipment.

According to an eighth aspect of the present invention, the cover member is made of a metal material, and the motor drive unit is connected to the cover member.

According to this structure, the cover member is made of a metal material. This allows the cover member to have high thermal conductivity. Because connected to the cover member, the motor drive unit is capable of transmitting the heat generated in the motor drive unit to the cover member, allowing the heat to be dissipated from the cover member to the outside of the electric motor. Therefore, it is possible to form an electric motor with excellent dissipation ability.

According to a ninth aspect of the present invention, a pump unit is coupled integrally to an end of the motor case on a second side in the axial direction to form an electric pump, and the electric motor functions as a drive source of the electric pump.

According to a tenth aspect of the present invention, an electric pump includes: a motor unit including a stator and a rotor, the stator being provided inside a motor case constituting a part of a housing, and the rotor being pivotally supported in a rotatable manner inside the stator in a radial direction; a control device that is coupled integrally to an end of the motor case in an axial direction, and a pump unit that couples integrally to an opposite end of the motor case in the axial direction. The control device includes: a bus bar unit main body that has a base unit with a plurality of bus bars wired thereinside and has a connector unit provided integrally on the base unit; a motor drive unit that drives the motor unit; and a motor control unit that controls the motor drive unit. The motor drive unit is attached to a first surface of the base unit in the axial direction, and the motor control unit is attached to a second surface of the base unit in the axial direction.

According to this structure, it is possible to form a small electric pump.

Furthermore, according to this structure, it is possible to form an electric pump that is capable of preventing water from infiltrating from the connector unit into the housing, and to ensure waterproofness.

Advantage of the Invention

According to the aforementioned electric motor, the motor drive unit is attached to the first surface of the base unit, and the motor control unit is attached to the second surface of the base unit. Therefore, it is possible to make the first surface and the second surface of the base unit smaller in area, and hence, to make the external shape of the base unit smaller than the case where the motor drive unit and the motor control unit are attached to only either one of the first surface and the second surface of the base unit. Furthermore, a plurality of bus bars are wired inside the base unit. Therefore, it is possible to make the external shape of the base unit smaller and make the base unit thinner than the case where, in the first surface and the second surface of the base unit, the bus bars are wired while circumventing the motor drive unit and the motor control unit. Accordingly, it is possible to make the electric motor smaller in the axial direction and the radial direction.

According to the aforementioned electric motor, the connector unit is led out to the outside through the through-hole of the housing, and the sealing member annularly arranged around the connector unit is sandwiched between the seal face and the housing. Therefore, it is possible to prevent the water, which has infiltrated from a gap between the connector unit and the through-hole, from moving outer than the sealing member. Consequently, it is possible to prevent water from infiltrating from the connector unit into the housing, and to ensure the waterproofness of the electric motor.

DESCRIPTION OF THE EMBODIMENTS (First Embodiment)

Hereunder is a description of an electric motor and an electric pump that uses the electric motor as its drive source according to a first embodiment of the present invention, with reference to the drawings.

Figure 1:
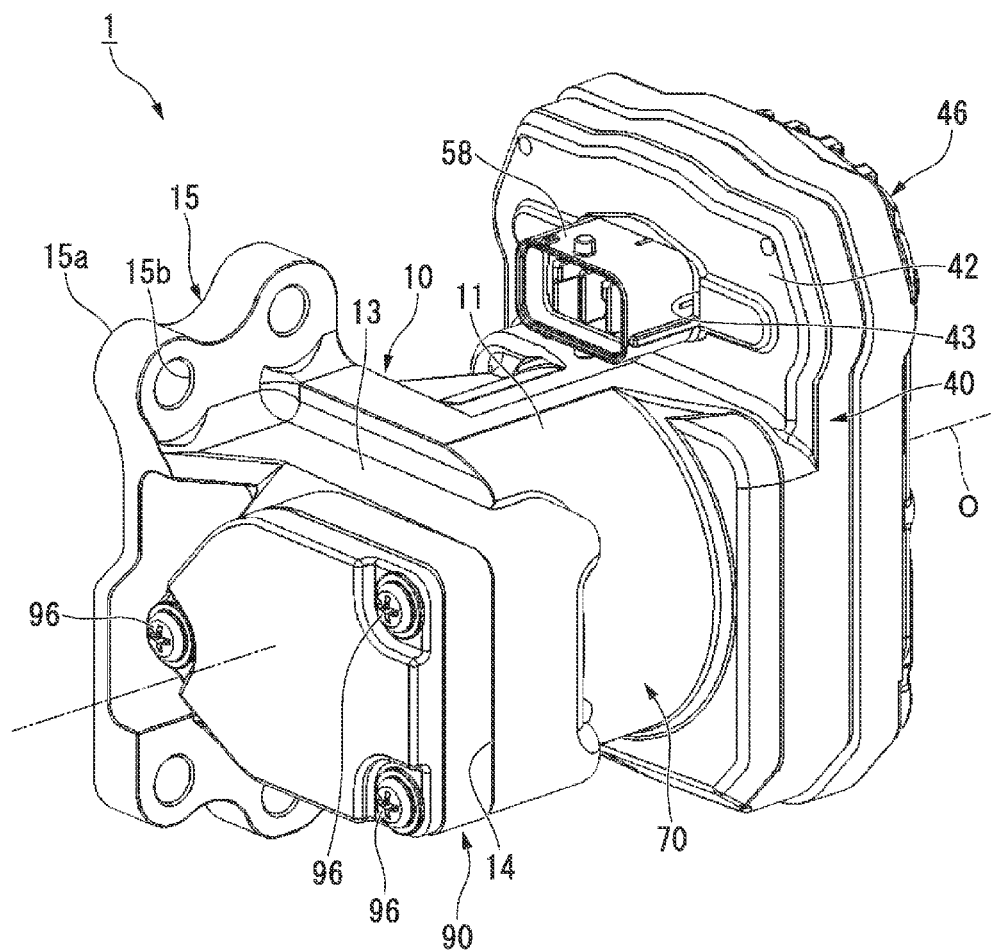
FIG. 1 is a perspective view of an electric pump according to a first embodiment.

FIG. 1 is a perspective view of an electric pump 1 according to the first embodiment.

Figure 2:
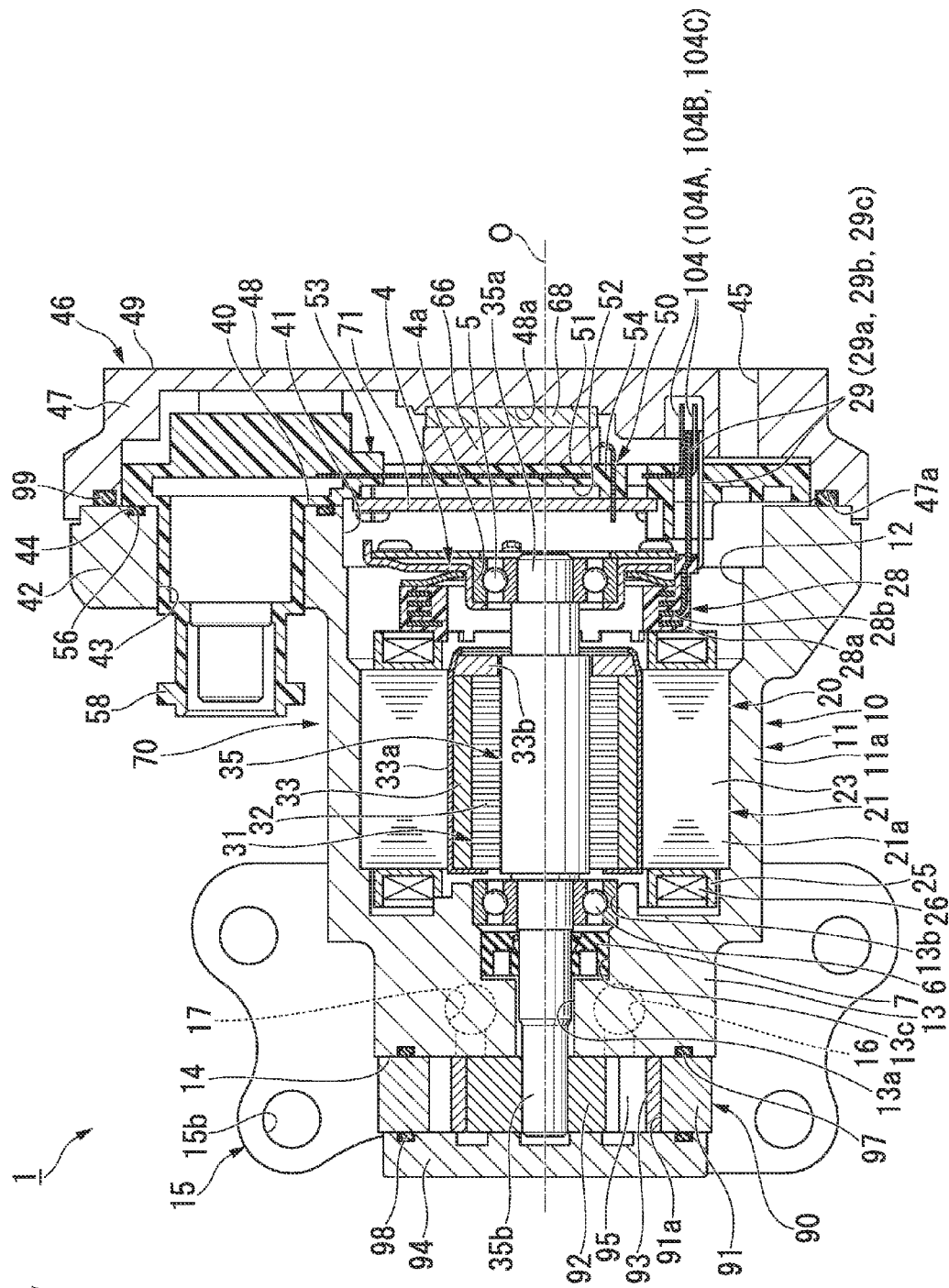
FIG. 2 is a lateral cross-sectional view of the electric pump including its central axis.

FIG. 2 is a lateral cross-sectional view of the electric pump 1 including a central axis O.

As shown in FIG. 1, the electric pump 1 is for pneumatically sending oil to, for example, a drive motor in a hybrid motor vehicle, or to a gearbox or the like connected to the drive motor. The electric pump 1 is made of: a housing 10; an electric motor 70 that is contained inside the housing 10 and includes a brushless motor 20 (motor unit) and a control device 50 for controlling the brushless motor 20, as shown in FIG. 2; and a pump unit 90 that is provided outside the housing 10 and is driven by the electric motor 70. Here, the electric motor 70 and the pump unit 90 have a central axis that is common with the central axis O of the electric pump 1. In the following description, a direction along the central axis O is referred to as an axial direction, a direction orthogonal to the central axis O is referred to as a radial direction, and a direction about the central axis O is referred to as a circumferential direction.

The housing 10 is made of a metal material. In the present embodiment, the housing 10 is formed by die-casting an aluminum material. The housing 10 is made of: a motor case 11 with a bottomed cylindrical shape that has an opening section 12 on a first side in the axial direction and a bottom section 13 on a second side in the axial direction; and a cover member 46 that is attached to a side of the opening section 12 of the motor case 11. Inside the motor case 11, the brushless motor 20 is arranged. At an end of the motor case 11 on the side of the opening section 12 in the axial direction, the control device 50 is arranged so as to be integrally coupled thereto. At an end (external end face 14) of the motor case 11 on the second side, that is, the side of the bottom section 13, the pump unit 90 is arranged so as to be integrally coupled thereto.

The motor case 11 has a substantially cylindrical barrel section 11a. To an inner circumferential surface of the barrel section 11a, a stator 21 is fixed by fixation means such as bonding or press-fit. The stator 21 is made of a substantially cylindrical stator core 21a. The stator core 21a is made of radially stacked metal sheets (magnetic steel sheets) that have been, for example, annularly punched by press working in a state with the metal sheets being divided in a predetermined number in the circumferential direction. In the stator core 21a, a plurality of teeth 23 around each of which a coil 26 is to be wound are formed in a radial manner. In the present embodiment, the stator core 21a is divided in nine. Furthermore, in the present embodiment, nine teeth 23 are formed.

Between the teeth 23, a slot (not shown in the figures) is formed. Nine slots are formed at regular intervals along the circumferential direction. To each of the teeth 23, an insulator 25 as an insulating material is attached over the whole circumference. Around the insulators 25, coils 26 corresponding to the three phases of U phase, V phase, and W phase are wound. Namely, the brushless motor 20 of this embodiment is a three-phase brushless motor provided with the coils 26 for the three phases of U phase, V phase, and W phase.

End sections of each coil 26 wound around each of the teeth 23 are drawn out toward the opening section 12 of the motor case 11, and are connected to a bus bar ring unit 28 arranged there.

The bus bar ring unit 28 is for supplying electric power to the coil 26 from outside. The bus bar ring unit 28 is made of a substantially cylindrical bus bar ring holder 28a made from an insulating material, in which a plurality of metal bus bar rings 28b are buried. In the present embodiment, four bus bar rings 28b are buried. To each bus bar ring 28b, end sections of the predetermined coils 26 are electrically connected. Thus, the bus bar rings 28b are assigned to the bus bars for the respective phases. To be more specific, the bus bar rings 28b are assigned to: the bus bar for U phase, the bus bar for V phase, and the bus bar for W phase that are respectively connected to a wind-start end (not shown in the figures) of the respective coils 26 for the respective phases; and a neutral-point bus bar that is connected to wind-end ends (not shown in the figures) of the coils 26 for the respective phases. Of the bus bar rings 28b, the bus bars for U to W phases respectively include feed terminals 29 (29a to 29c) that are erected so as to be along the axial direction toward the opening section 12 of the motor case 11. The feed terminals 29a to 29c are electrically connected to the control device 50.

Of the feed terminals 29a to 29c, the feed terminal 29b is slightly offset to the center of the opening section 12 of the motor case 11 with respect to the feed terminals 29a, 29c.

To an end of the motor case 11 on the side of the opening section 12, there is provided a bearing holder 4, which is made of a steel sheet material by press molding, for closing the opening section 12 of the motor case 11. At the central section of the bearing holder 4, a cylindrical bearing sustaining section 4a that is arranged inner than the bus bar ring unit 28 is formed. Into the bearing sustaining section 4a, a bearing 5 is fitted.

The bottom section 13 of the motor case 11 has its cross-section along the axial direction formed in a substantially rectangular shape with a predetermined thickness in the axial direction. At the central section of the bottom section 13 of the motor case 11, there is formed a shaft penetration hole 13a that extends through the bottom section 13 along the axial direction. In the bottom section 13 of the motor case 11, a bearing sustaining section 13b and a seal sustaining section 13c are arranged in this order from the opening section 12 to the bottom section 13. The bearing sustaining section 13b is smaller in diameter than the barrel section 11a while the seal sustaining section 13c is smaller in diameter than the bearing sustaining section 13b. Into the bearing sustaining section 13b, a bearing 6 is fitted. Into the seal sustaining section 13c, a ring-like oil seal 7 is fitted, which prevents oil from infiltrating into the motor case 11.

On the internal side of the stator 21 in the radial direction, there is provided a rotor 31. The rotor 31 includes: a rotation shaft 35; a rotor core 32 that is fixed to an outer circumferential surface of the rotation shaft 35; a plurality of magnets 33 that are circumferentially arranged on an outer circumferential surface of the rotor core 32; a magnet cover 33a for sustaining the magnets 33 onto the rotor core 32; and a magnet holder 33b. Similarly to the stator 21, the rotor core 32 is made of a radially stacked metal sheets (magnetic steel sheets) that have been, for example, annularly punched by press working. The magnets 33 are arranged on the radially outer surface of the rotor core 32 so that their polarity alternates in the circumferential direction.

The rotation shaft 35 is supported by the bearing 5 provided in the bearing holder 4 and by the bearing 6 provided in the bottom section 13 of the motor case 11. As a result, the rotor 31 is pivotally supported in a rotatable manner on the radially inner side of the stator 21 so as to be coaxial with the central axis O. A first end 35a of the rotation shaft 35 is arranged at an end of the opening section 12 of the motor case 11. A second end 35b of the rotation shaft 35 is inserted through the bearing 6, the oil seal 7, and the shaft penetration hole 13a, and protrudes outer than the external end face 14 of the bottom section 13 of the motor case 11.

In an internal portion of the bottom section 13 of the motor case 11, an intake port 16 and an discharge port 17 are integrally formed that communicate between an external portion of the motor case 11, which is a first surface 15a of the bottom section 13 in the radial direction (see FIG. 1), and the external end face 14 of the bottom section 13. The intake port 16 and the discharge port 17 are in communication with an interior portion of the pump unit 90 that is provided so as to be integrally coupled to the external end face 14 of the bottom section 13 of the motor case 11. Thus, as will be described later, even if oil itself has heat when the electric pump 1 fastened and fixed to an attachee such as a gearbox is driven, the heat is transmitted from the intake port 16 and the discharge port 17 to the motor case 11 made of a metal material. Especially, with the motor case 11 being made of an aluminum material with high heat conductivity, it is possible to effectively diffuse the heat of the oil.

The pump unit 90 is, for example, a trochoidal pump. It is made of: a pump case 91 attached to the external end face 14 of the motor case 11; an inner rotor 92 and an outer rotor 93 that are provided in the pump case 91; and a pump cover 94 that covers the pump case 91 from the outside in the axial direction.

The pump case 91 is made of, for example, a metal material such as iron (carbon steel) or aluminum in a frame-like shape. An internal side thereof functions as a pump containing section 91a that is circular when seen in the axial direction. The pump containing section 91a is decentered with respect to the central axis O. The pump case 91 is fastened to the external end face 14 of the motor case 11 by, for example, screwing down a plurality of bolts 96 (see FIG. 1). Between the external end face 14 of the motor case 11 and the pump case 91, an O-ring 97 is arranged over the whole circumference in the circumferential direction. This ensures the sealing ability between the external end face 14 of the motor case 11 and the pump cover 94.

The inner rotor 92 is made of, for example, a metal material such as iron (carbon steel) or aluminum. It has a plurality of external teeth. In the present embodiment, the inner rotor 92 has seven external teeth. The inner rotor 92 is supported in a manner relatively movable in the axial direction and relatively non-movatable in the circumferential direction. For this purpose, for example, a second end 35b of the rotation shaft 35 is subjected to machining of symmetrically removing two sides.

Similarly to the inner rotor 92, the outer rotor 93 is made of, for example, a metal material such as iron (carbon steel) or aluminum. It has a plurality of internal teeth that are more numerous than the external teeth of the inner rotor 92 and are capable of engaging the external teeth of the inner rotor 92. In the present embodiment, the outer rotor 93 has eight internal teeth. The outer rotor 93 is formed so as to have an outer diameter slightly smaller than an inner diameter of the pump containing section 91a. With the rotation of the inner rotor 92, the outer rotor 93 rotates while a part of an outer circumferential surface of the outer rotor 93 is supported by an inner circumferential surface of the pump containing section 91a.

Between the external teeth of the inner rotor 92 and the internal teeth of the outer rotor 93 that engage each other, a pump chamber 95 is formed. The pump chamber 95 is formed so that its capacity increases and decreases with the rotations of the inner rotor 92 and the outer rotor 93. The pump chamber 95 is in communication with the intake port 16 and the discharge port 17. With an increase in its capacity, the pump chamber 95 sucks oil from the outside of the pump chamber 95 into the inside of the pump chamber 95 through the intake port 16. With a decrease in its capacity, the pump chamber 95 discharges oil from the inside of the pump chamber 95 to the outside of the pump chamber 95 through the discharge port 17.

The pump cover 94 is made of, for example, a metal material such as iron (carbon steel) or aluminum. It is fixed to the pump case 91 from the outside in the axial direction with bolts or the like (not shown in the figures). Between the pump case 91 and the pump cover 94, an O-ring 98 is arranged over the whole circumference in the circumferential direction. This ensures the sealing ability between the pump case 91 and the pump cover 94.

When the pump case 91 is fastened to the external end face 14 of the motor case 11 with the bolts 96 (see FIG. 1), the O-ring 97 and the O-ring 98 are compressed in the axial direction. This allows the two portions to exert sealing ability.

As shown in FIG. 1, in the first surface 15a of the bottom section 13 of the motor case 11 in radial direction, there is formed an electric pump attachment section 15 that extends externally. In the electric pump attachment section 15, a plurality of attachment holes 15b are formed. With bolts (not shown in the figures) that have been inserted through the attachment holes 15b being fastened to an attachee such as a gearbox, the electric pump 1 is attached to the attachee. This allows the intake port 16 and the discharge port 17 (see FIG. 2) to be in communication with an internal portion of the attachee and to be capable of pneumatically sending oil into the attachee.

Figure 3:
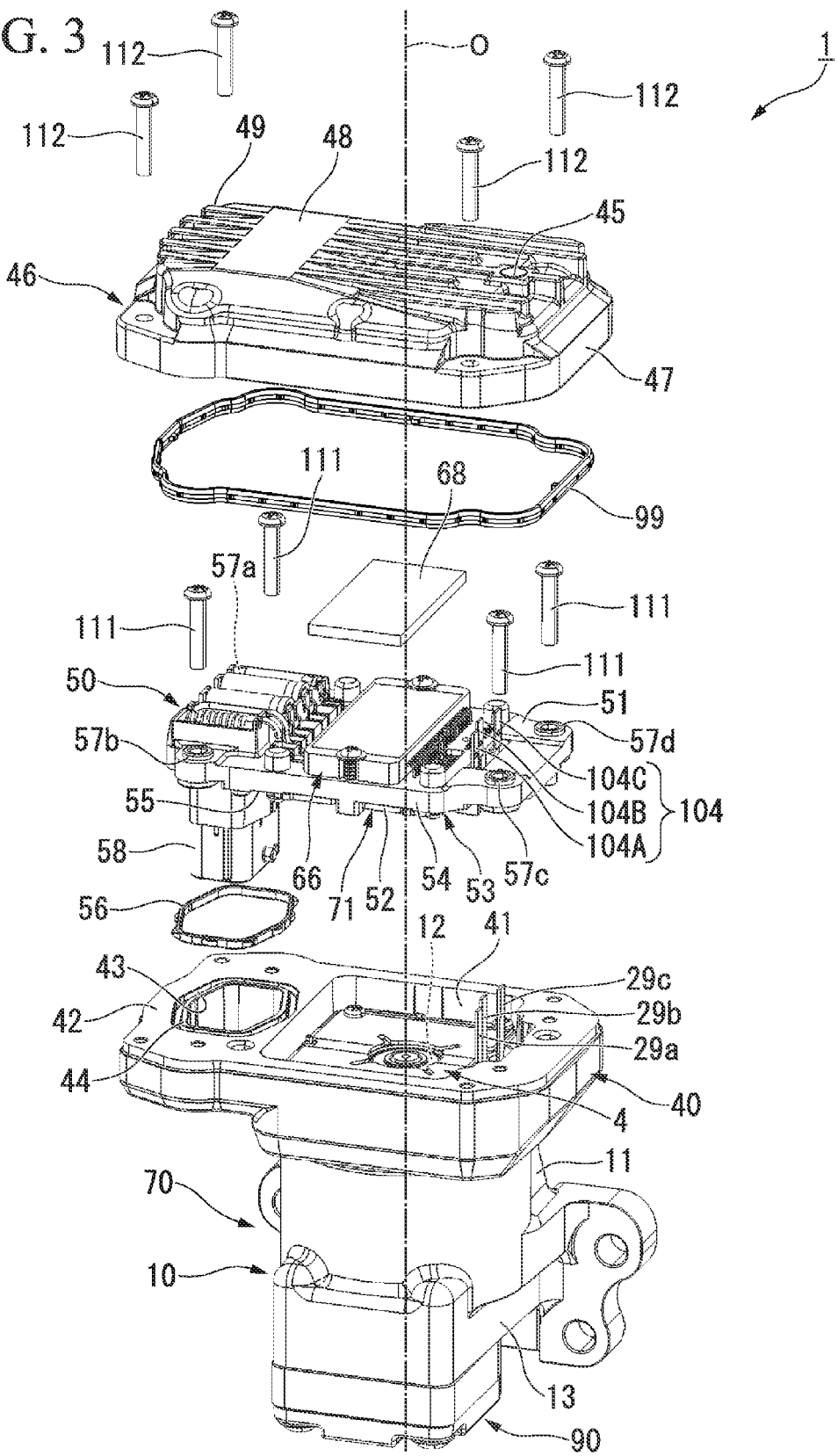
FIG. 3 is an exploded perspective view of a housing.

FIG. 3 is an exploded perspective view of the housing 10.

As shown in FIG. 3, at an end of the motor case 11 on the side of the opening section 12 and also outer than the bearing holder 4 in the axial direction, there is provided a control device disposition section 40 for attachment of the control device 50. The control device disposition section 40 has a substantially oblong shape with a disposition opening 41 that is in communication with the opening section 12 of the motor case 11 when seen in the axial direction. The control device disposition section 40 is formed integrally on the motor case 11. A first end of the control device disposition section 40 in its longitudinal direction is a flange section 42 that extends externally from the motor case 11 in the radial direction when seen in the axial direction. At the central section of the flange section 42, there is formed a through-hole 43 that extends through in the axial direction.

Figure 4:
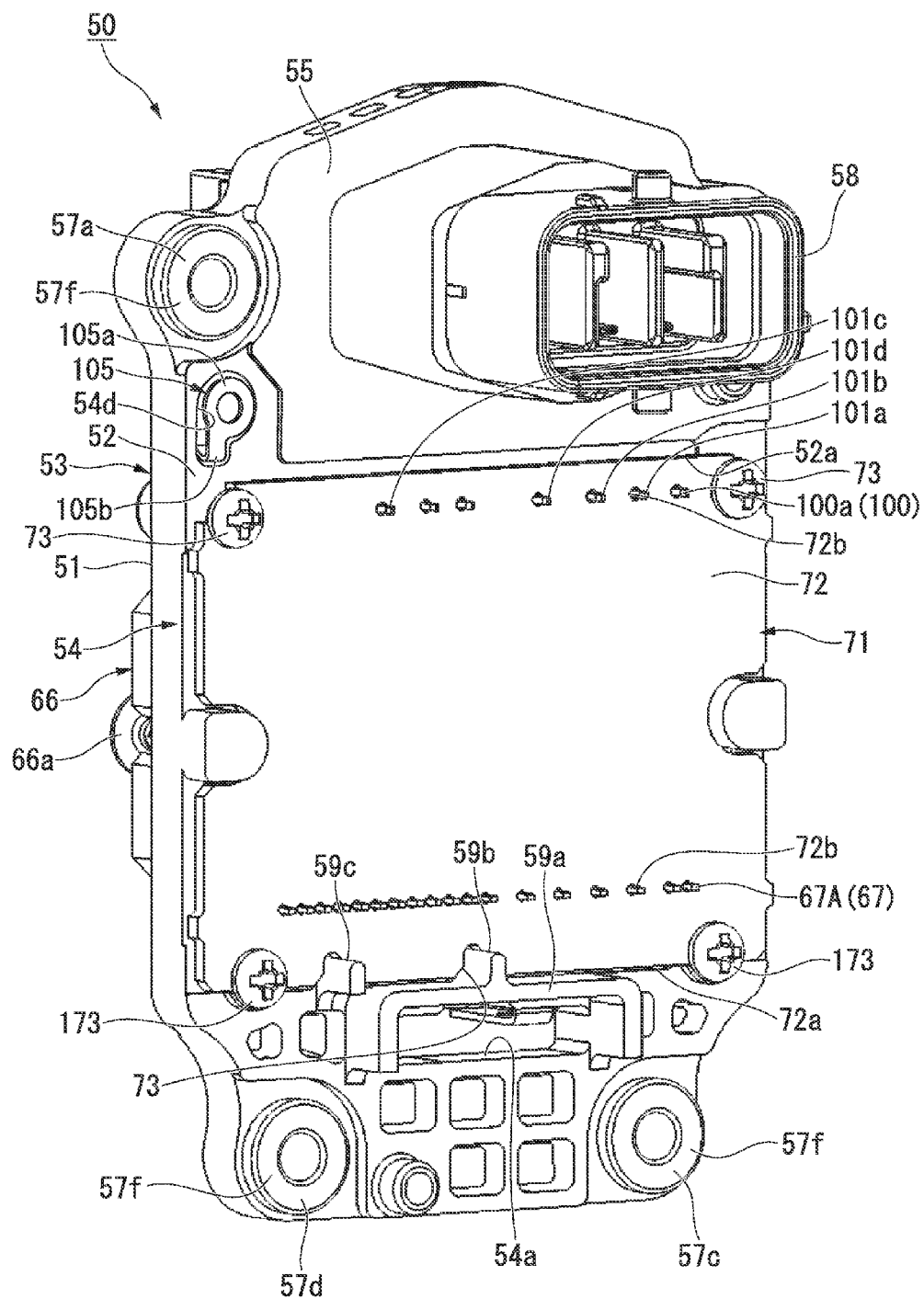
FIG. 4 is a perspective view of an appearance of a control device when seen from an inside of a motor case.
Figure 5:
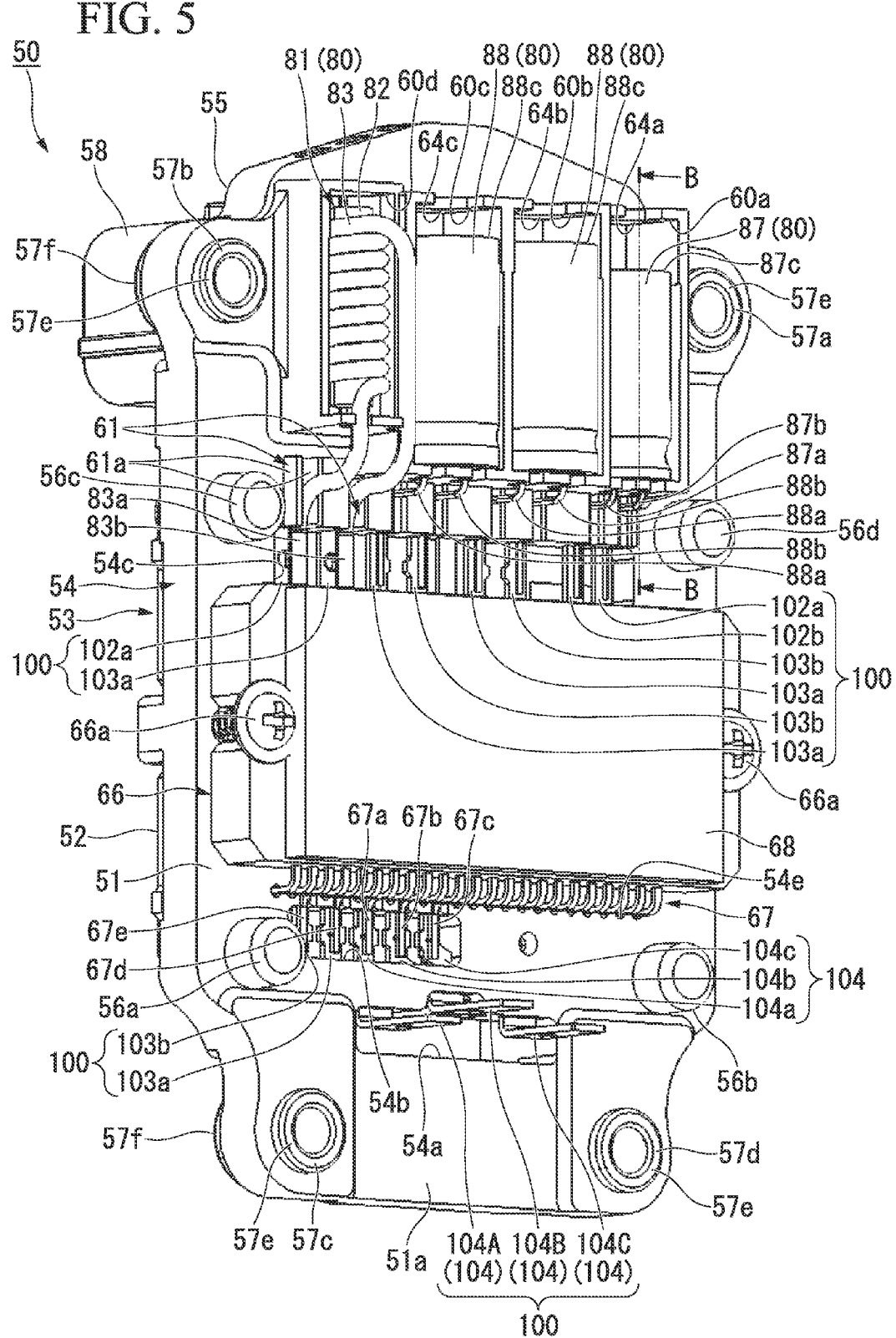
FIG. 5 is a perspective view of an appearance of the control device when seen from an outside of the motor case.

FIG. 4 is a perspective view of an appearance of the control device 50 when seen from the inside of the motor case 11 (see FIG. 3). FIG. 5 is a perspective view of an appearance of the control device 50 when seen from the outside of the motor case 11 (see FIG. 3).

As shown in FIG. 4 and FIG. 5, the control device 50 is made of: a plate-like bus bar unit main body 53 that is mainly used as a main body; a motor drive unit 66 that drives the brushless motor 20 (see FIG. 2); a motor control unit 71 that controls the motor drive unit 66; and a plurality of noise prevention elements 80 that suppress noise of the electric current supplied from an external power source. In the following description, an external surface of the motor case 11 (see FIG. 3) of the control device 50 is referred to as a first main surface 51 (first surface in the axial direction) while an internal surface of the motor case 11 (see FIG. 3), which is on the side opposite to the first main surface 51, is referred to as a second main surface 52 (second surface in the axial direction).

As shown in FIG. 5, the bus bar unit main body 53 includes: a base unit 54 made of an insulating material in which a plurality of bus bars 100 are wired; and a connector unit 58 that is provided integrally on the base unit 54 at a site corresponding to the flange section 42 (see FIG. 3) of the housing 10.

The base unit 54 is formed in a substantially oblong plate-like shape when seen in a planar view. Inside the base unit 54, the bus bars 100 are provided by molding. In the base unit 54, a first bus bar opening 54a is formed at a site corresponding to the feed terminals 29a to 29c (see FIG. 3), a second bus bar opening 54b is formed on the side of the first bus bar opening 54a closer to the connector unit 58, and a third bus bar opening 54c is formed on the side of the connector unit 58 closer to the first bus bar opening 54a. The first bus bar opening 54a, the second bus bar opening 54b, and the third bus bar opening 54c extend through the base unit 54 in the axial direction.

The bus bars 100 mainly include: signal-system terminal bus bars 101a to 101d (see FIG. 4); power terminal bus bars 102a, 102b; power bus bars 103a, 103b; three-phase bus bars 104A to 104C; and a ground terminal 105. Each of these is formed of, for example, a metal sheet material such as copper bent into a desired shape.

As shown in FIG. 4, the signal-system terminal bus bars 101a to 101d are molded from the base unit 54 to the connector unit 58. First ends of these are arranged inside the connector unit 58 while second ends thereof are erected from the second main surface 52 of the bus bar unit main body 53. Thus, the signal-system terminal bus bars 101a to 101d electrically connect between an external control device (not shown in the figures) and the motor control unit 71.

As shown in FIG. 5, the power terminal bus bars 102a, 102b are similarly molded from the base unit 54 to the connector unit 58. First ends of these are arranged inside the connector unit 58. The power terminal bus bars 102a, 102b and the power bus bars 103a, 103b electrically connect between the external power source and the motor drive unit 66 via the noise prevention elements 80. In the present embodiment, the power terminal bus bar 102b and the power bus bar 103b on the negative electrode side are integrally formed, and buried in the base unit 54.

The power terminal bus bars 102a, 102b are partially exposed from the third bus bar opening 54c. The power terminal bus bar 102a is partially erected from the second main surface 52 of the bus bar unit main body 53, and is electrically connected to the motor control unit 71 (see FIG. 4).

The power bus bars 103a, 103b are partially exposed from the second bus bar opening 54b and the third bus bar opening 54c. The power bus bars 103a, 103b are partially erected from the second main surface 52 of the bus bar unit main body 53, and are electrically connected to the motor control unit 71 (see FIG. 4).

The three-phase bus bars 104A to 104C electrically connect the motor drive unit 66 to the feed terminals 29a to 29c (see FIG. 3) of the bus bar ring unit 28, respectively.

The drive terminals 104A to 104C extend so as to be respectively along directions in which the feed terminals 29a to 29c extend from the first bus bar opening 54a (see FIG. 5) (hereinafter, referred to simply as extension direction). Of the drive terminals 104A to 104C, the drive terminal 104B is slightly offset to the motor drive unit 66 with respect to the drive terminals 104A, 104C so as to be electrically connectable to the feed terminal 29b. The extension directions of the feed terminals 29a to 29c of the present embodiment coincide with the axial direction. The drive terminals 104A to 104C and the feed terminals 29a to 29c are mechanically and electrically connected to each other by, for example, projection welding. The connection between the drive terminals 104A to 104C and the feed terminals 29a to 29c will be described in detail later.

Figure 6:
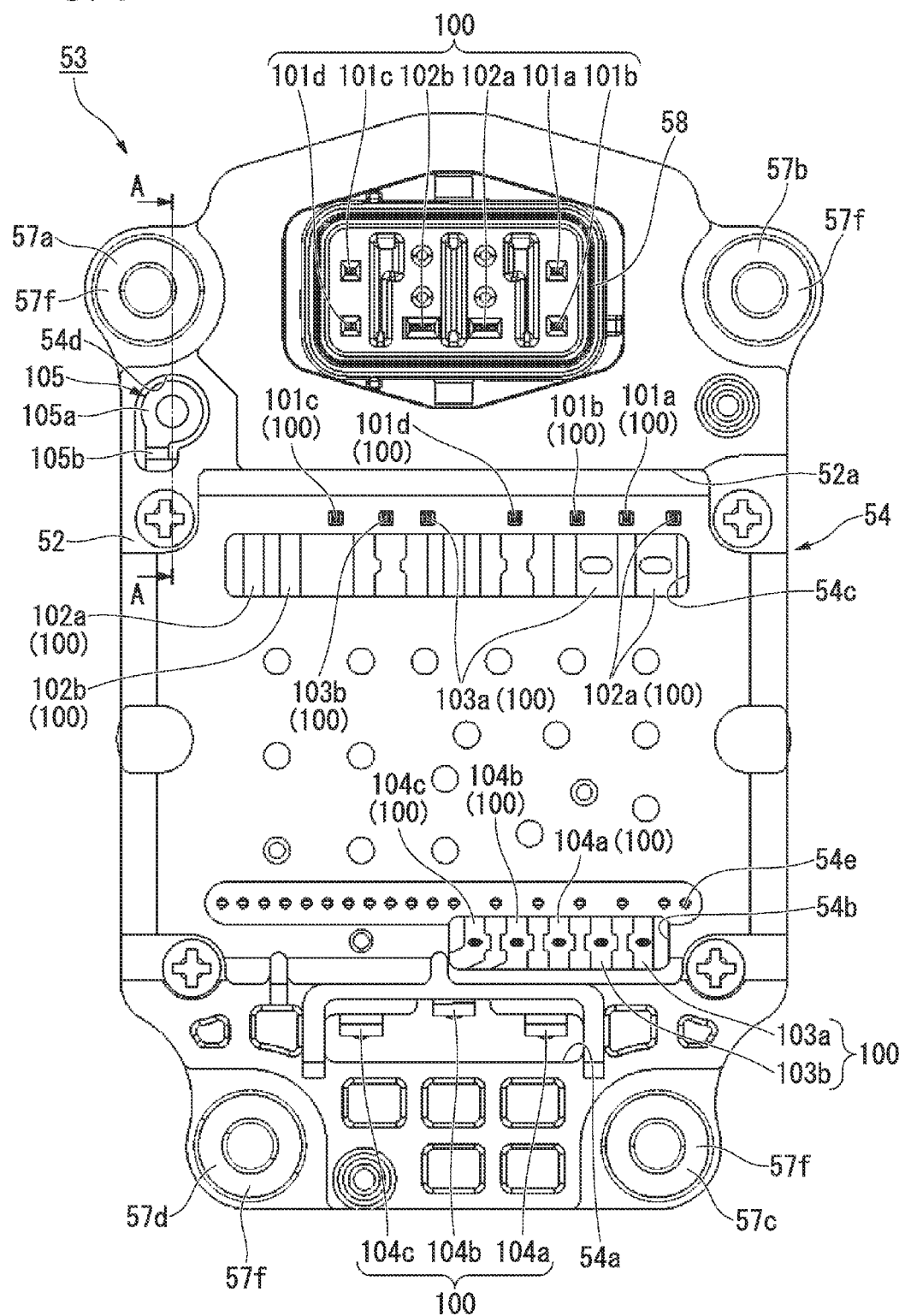
FIG. 6 is a plan view of a bus bar unit main body when seen from a second main surface side.

FIG. 6 is a plan view of the bus bar unit main body 53 when seen from the second main surface 52 side.

As shown in FIG. 6, the bus bar unit main body 53 includes: a base unit 54 made of an insulating material in which a plurality of bus bars 100 are wired; and a connector unit 58 that is provided integrally on the base unit 54 at a site corresponding to the flange section 42 (see FIG. 3) of the housing 10.

The base unit 54 is formed in a substantially oblong plate-like shape when seen in a planar view. Inside the base unit 54, the bus bars 100 are provided by molding. In the base unit 54, a first bus bar opening 54a is formed at a site corresponding to the feed terminals 29a to 29c (see FIG. 3), a second bus bar opening 54b is formed on the side of the first bus bar opening 54a closer to the connector unit 58, and a third bus bar opening 54c is formed on the side of the connector unit 58 closer to the first bus bar opening 54a. The first bus bar opening 54a, the second bus bar opening 54b, and the third bus bar opening 54c extend through the base unit 54 in the axial direction.

The bus bars 100 mainly include: signal-system terminal bus bars 101a to 101d; power terminal bus bars 102a, 102b; power bus bars 103a, 103b; three-phase bus bars 104A to 104C; and a ground terminal 105. Each of these is formed of, for example, a metal sheet material such as copper bent into a desired shape.

The signal-system terminal bus bars 101a to 101d are molded from the base unit 54 to the connector unit 58. First ends of these are arranged inside the connector unit 58 while second ends thereof are erected from the second main surface 52 of the bus bar unit main body 53. Thus, the signal-system terminal bus bars 101a to 101d electrically connect between an external control device (not shown in the figures) and the motor control unit 71 (see FIG. 4).

The power terminal bus bars 102a, 102b are similarly molded from the base unit 54 to the connector unit 58. First ends of these are arranged inside the connector unit 58. The power terminal bus bars 102a, 102b and the power bus bars 103a, 103b electrically connect between the external power source and the motor drive unit 66 (see FIG. 5) via the noise prevention elements 80 (see FIG. 5). In the present embodiment, the power terminal bus bar 102b and the power bus bar 103b on the negative electrode side are integrally formed, and buried in the base unit 54.

The power terminal bus bars 102a, 102b are partially exposed from the third bus bar opening 54c. The power terminal bus bar 102a is partially erected from the second main surface 52 of the bus bar unit main body 53, and is electrically connected to the motor control unit 71 (see FIG. 4).

The power bus bars 103a, 103b are partially exposed from the second bus bar opening 54b and the third bus bar opening 54c. The power bus bars 103a, 103b are partially erected from the second main surface 52 of the bus bar unit main body 53, and are electrically connected to the motor control unit 71 (see FIG. 4).

The three-phase bus bars 104A to 104C electrically connect the motor drive unit 66 to the feed terminals 29a to 29c (see FIG. 3) of the bus bar ring unit 28, respectively.

As shown in FIG. 3, first ends of the three-phase bus bars 104A to 104C are erected from the first bus bar opening 54a (see FIG. 6) toward the outside of the housing 10 so as to be respectively along the feed terminals 29a to 29c. The first ends of the three-phase bus bars 104A to 104C are joined to the feed terminals 29a to 29c by, for example, welding. Furthermore, as shown in FIG. 6, the second ends of the three-phase bus bars 104A to 104C are arranged in parallel with ends of the power bus bars 103a, 103b, and are exposed from the second bus bar opening 54b.

The ground terminal 105 is a terminal for securing a ground of a supply circuit. At a position corresponding to the flange section 42 (see FIG. 3) of the motor case 11, the ground terminal 105 is exposed from the second main surface 52 of the bus bar unit main body 53 to the outside through a ground terminal opening 54d. The ground terminal 105 includes: an annular fixation unit 105a; and an extension section 105b that extends from the power terminal bus bar 102b on the negative electrode side toward the fixation unit 105a. The ground terminal 105 is made of, for example, a metal material such as copper so as to be integral with the power terminal bus bar 102b on the negative electrode side.

Figure 7:
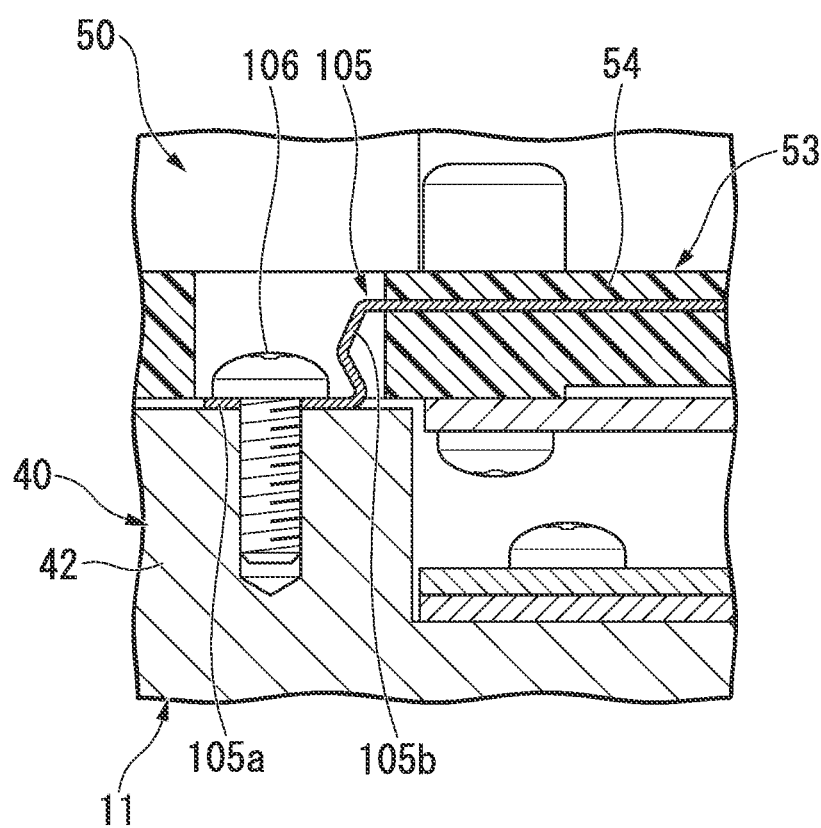
FIG. 7 is a cross-sectional view of FIG. 6, taken along the A-A line.

FIG. 7 is a cross-sectional view of FIG. 6, taken along the A-A line. FIG. 7 illustrates a state in which the control device 50 is attached to the motor case 11.

As shown in FIG. 7, the fixation unit 105a of the ground terminal 105 is fastened and fixed to the flange section 42 of the motor case 11 with a ground bolt 106. Because the ground terminal 105 made of copper is fastened and fixed directly to the flange section 42, it is possible to secure a ground of the supply circuit with a small resistance value.

Of the extension section 105b, the part in the vicinity of the connection section to the fixation unit 105a is formed into a substantially crank-like shape when seen in a lateral cross-sectional view. This allows the extension section 105b to be elastically deformable with ease. As a result, even if a relative position between the control device 50 and the motor case 11 is changed due to, for example, thermal expansion, vibration, or the like, the extension section 105b is elastically deformed. This makes it possible to prevent the stress from being concentrated onto the ground terminal 105. Therefore, it is possible to improve the ability to resist vibration, the ability to resist heat, and the ability to resist thermal shock of the control device 50.

As shown in FIG. 5, in an area of the first main surface 51 of the base unit 54 that corresponds to the disposition opening 41 (see FIG. 3) of the control device disposition section 40, the motor drive unit 66 is attached with, for example, self-tapping screws 66a. The motor drive unit 66 is formed in a substantially rectangular shape when seen in a planar view. Into the motor drive unit 66, switching elements such as FETs (Field Effect Transistors) and IGBTs (Insulated Gate Bipolar Transistors) are built.

In a first surface of the motor drive unit 66 on the side of the first bus bar opening 54a, there are provided a terminal row 67. Some terminals in the terminal row 67 are formed in a substantially L-shape. They extend from the first main surface 51 of the base unit 54 toward the second main surface 52 via through-holes 54e, and their ends 67A protrude from the second main surface 52. Of the terminals in the terminal row 67, three three-phase terminals 67a, 67b, 67c are formed in a substantially crank-like shape, and are electrically connected respectively to the second ends of the three-phase bus bars 104A to 104C that are exposed from the second bus bar opening 54b. Of the terminals in the terminal row 67, two power terminals 67d, 67e are formed in a substantially crank-like shape, and are connected respectively to ends of the power bus bars 103a, 103b that are exposed from the second bus bar opening 54b.

The motor drive unit 66 converts a direct current that has been input from the power terminals 67d, 67e to a three-phase alternating current, and then output the converted current from the three-phase terminals 67a, 67b, 67c with a desired current pattern.

To an external main surface of the motor drive unit 66, there is attached a heat dissipation sheet 68 made of for example, silicone rubber.

As shown in FIG. 6, in an area of the second main surface 52 of the base unit 54 that corresponds to the disposition opening 41 (see FIG. 3) of the control device disposition section 40, there is formed a recess section 52a that is further back from the rest of the surface.

As shown in FIG. 4, at a position corresponding to the recess section 52a, the motor control unit 71 is arranged. As the motor control unit 71, a substantially rectangular plate-like multilayered substrate 72 on which electronic elements (not shown in the figures) are contained is used. The multilayered substrate 72 is made of, for example, glass epoxy in which wiring patterns are printed. In the multilayered substrate 72 of the motor control unit 71, there are formed a plurality of through-holes 72b, through which second ends of the signal-system terminal bus bars 101a to 101d (see FIG. 6) erected from the second main surface 52, parts of the power bus bars 103a, 103b (see FIG. 6) (hereinafter, referred to generically as "protruded terminals 100a of the bus bars 100"), and ends 67A of the terminal row 67 of the motor drive unit 66 are to be inserted.

When the motor control unit 71 is attached to the base unit 54, it is necessary to insert the protruded terminals 100a of the bus bars 100 and the ends 67A of the terminal row 67 through the through-holes 72b while the multilayered substrate 72 is being positioned. In conventional work, for example, positioning pins are provided on the base unit 54, and positioning holes are provided in the motor control unit 71. Subsequently, the protruded terminals 100a of the bus bars 100 and the ends 67A of the terminal row 67 are inserted through the through-holes 72b while the positioning pins are being inserted through the positioning holes. However, when the motor control unit 71 is attached to the base unit 54, the positioning pins on the base unit 54 are hidden behind the motor control unit 71. This makes it difficult to insert the positioning pins through the positioning holes. Accordingly, the workability has room for improvement.

Therefore, in an edge 72a of the multilayered substrate 72 on the side of the first bus bar opening 54a, there are provide a pair of notches 73, 73 for positioning. Furthermore, on the base unit 54, there is provided a wall section 59a on the periphery of the first bus bar opening 54a at a position corresponding to the edge 72a of the multilayered substrate 72. Also, there are provided a pair of positioning pins 59b, 59c at positions corresponding to the notches 73 of the multilayered substrate 72.

The wall section 59a extends so as to be along the edge 72a of the multilayered substrate 72. The wall section 59a is formed so as to be higher than the protruded terminals 100a of the bus bars 100 erected from the second main surface 52 and than the ends 67A of the terminal row 67 of the motor drive unit 66.

Of the pair of positioning pins 59b, 59c, the positioning pin 59b is provided integrally on the wall section 59a while the positioning pin 59c is provided on the side surface of the wall section 59a. The pair of positioning pins 59b, 59c are both formed so as to be as high as the wall section 59a.

Figure 8:
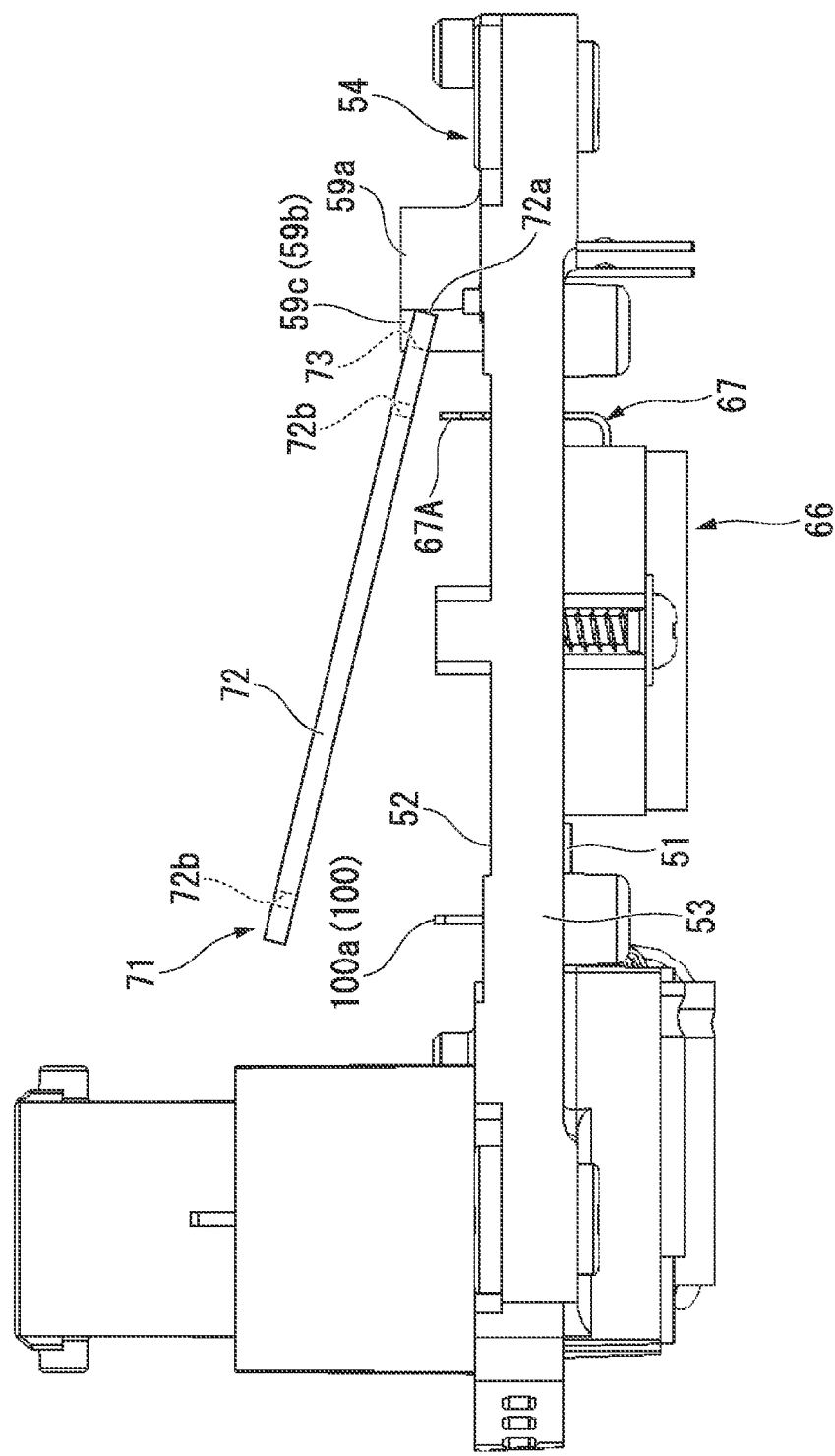
FIG. 8 is an explanatory diagram for attaching a motor control unit.

FIG. 8 is an explanatory diagram for attaching the motor control unit 71.

The motor control unit 71 is attached to the base unit 54 in the following manner. As shown in FIG. 8, with the multilayered substrate 72 being inclined with respect to the second main surface 52 of the base unit 54, the positioning pins 59b, 59c are brought into contact with the notches 73, 73 of the multilayered substrate 72.

Subsequently, while the multilayered substrate 72 is being moved toward the second main surface 52 of the base unit 54, the protruded terminals 100a of the bus bars 100 and the ends 67A of the terminal row 67 of the motor drive unit 66 are inserted through the through-holes 72b of the multilayered substrate 72.

Finally, the protruded terminals 100a of the bus bar 100 and the ends 67A of the terminal row 67 of the motor drive unit 66 that have been inserted through the through-holes 72b are joined to the multilayered substrate 72 with, for example, solder or the like. Furthermore, the motor control unit 71 is fixed to the base unit 54 with self-tapping screws or the like. Thus, the attachment of the motor control unit 71 to the base unit 54 is completed. In this manner, while the motor control unit 71 is being positioned with ease, it is possible to insert the protruded terminals 100a of the bus bars 100 and the ends 67A of the terminal row 67 of the motor drive unit 66 through the through-holes 72b. Therefore, it is possible to ensure favorable workability when the motor control unit 71 is attached to the base unit 54.

As shown in FIG. 2, at a site of the second main surface 52 of the base unit 54 that corresponds to the flange section 42 of the housing 10, there is erected a connector unit 58 from the second main surface 52 toward the bottom section 13 of the housing 10 along the axial direction. As shown in FIG. 6, the connector unit 58 has a substantially rectangular opening. Inside the opening, there are arranged first ends of the signal-system terminal bus bars 101a to 101d and first ends of the power terminal bus bars 102a, 102b. As shown in FIG. 3, when the control device 50 is attached to the control device disposition section 40, the connector unit 58 is led out to the outside of the housing 10 through the through-hole 43 of the flange section 42.

Here, as shown in FIG. 4, on the second main surface 52 of the base unit 54, a seal face 55 is formed around a base end of the connector unit 58. The seal face 55 is formed on a flat plane that is orthogonal to the central axis O (see FIG. 2). As shown in FIG. 3, between the seal face 55 of the base unit 54 and the flange section 42 of the housing 10, there is sandwiched a sealing member 56 that is disposed annularly around the connector unit 58. The sealing member 56 is an annular O-ring. The sealing member 56 is fitted into a ring groove 44 that is formed so as to surround the through-hole 43 of the flange section 42. Furthermore, the sealing member 56 is pressed slightly flatter by the seal face 55 of the base unit 54. As a result, the sealing member 56 ensures the sealing ability around the connector unit 58, and prevents the water, which has infiltrated from the gap between the connector unit 58 and the through-hole 43 of the flange section 42, from moving outer than the sealing member 56.

As shown in FIG. 5, in the control device 50, pipe-like collar members 57a to 57d made of a metal material are insert-molded in its four corners. Each of the collar members 57a to 57d includes: a cylindrical collar main body 57e; and a flange section 57f that is provided at an end of the collar main body 57e in the axial direction. Each of the collar members 57a to 57d are provided so that the flange section 57f is on the second main surface 52 of the base unit 54. As shown in FIG. 3, with each of the collar members 57a to 57d being fastened to the control device disposition section 40 by the insertion of the bolt 111 therethrough, the control device 50 is joined integrally to an end of the motor case 11 on the side of the opening section 12 in the axial direction. Here, the flange section 57f (see FIG. 4) of each of the collar members 57a to 57d makes it possible to increase the contact area (flange area) between each of the collar members 57a to 57d and the control device disposition section 40, thus improving the fastening power between the two.

Here, in the present embodiment, as shown in FIG. 6, of the collar members 57a to 57d, the collar members 57a, 57b (fixation devices) provided closer to the connector unit are provided symmetrically across the connector unit 58. They are uniformly arranged about the connector unit 58. Therefore, as shown in FIG. 3, when the collar member 57a, 57b, through which the corresponding bolts 111 (fixation devices) have been inserted, are fastened to the control device disposition section 40, then fastening loads are generated uniformly around the connector unit 58. As a result, the sealing member 56 disposed annularly around the connector unit 58 is pressed flatter substantially uniformly over the whole circumference by the flange section 42 of the housing 10 and the seal face 55 of the base unit 54. Accordingly, it is possible to ensure high sealing ability over the whole circumference around the connector unit 58.

The collar members 57a to 57d may be arranged inside the area formed by connecting the four collar members 57a to 57d as shown in FIG. 6. Also with this, it is possible to substantially uniformly generate fastening loads of the bolts 111 (see FIG. 3), to thereby ensure high sealing ability.

As shown in FIG. 5, the space above the first main surface 51 opposite to the connector unit 58 across the base unit 54 is a dead space. In this site, there are provided a plurality of noise prevention elements 80 that constitute the control device 50. The noise prevention elements 80 include, for example: an X-capacitor 87; smoothing capacitors 88, 88; and a choke coil 81. The X-capacitor 87, the smoothing capacitors 88, 88, and the choke coil 81 are respectively contained in noise prevention element containers 60a to 60d, which are each formed in a bathtub-like shape on the first main surface 51.

The X-capacitor 87 is provided mainly for suppressing radio noise. The X-capacitor 87 is, for example, a substantially cylindrical electrolytic capacitor, and is provided between the power terminal bus bars 102*a*, 102*b* (see FIG. 6). The X-capacitor 87 is arranged so that its central axis line is along a longitudinal direction of the base unit 54. From an end face of the X-capacitor 87 on the side of the motor drive unit 66, a pair of lead sections 87*a*, 87*b* extend in a substantially parallel manner.

The pair of lead sections 87*a*, 87*b* are formed in a substantially crank-like shape when seen in a lateral view. Front ends of the lead sections 87*a*, 87*b* are arranged in the third bus bar opening 54*c*, and are joined to the power terminal bus bars 102*a*, 102*b* by, for example, projection welding.

In an end face 87*c* of the X-capacitor 87 on a side opposite to the motor drive unit 66, there is provided a safety valve (not shown in the figures). To be more specific, as the safety valve of the X-capacitor 87, a groove with a predetermined shape that is formed in the end face 87*c* is used. When an inner pressure of the X-capacitor 87 increases to a predetermined value or greater due to heating or the like, the inner pressure is released through this groove.

The smoothing capacitor 88 is provided for suppressing the variation in voltage that arises with the drive of the brushless motor 20 (see FIG. 2). Similarly to the X-capacitor 87, the smoothing capacitor 88 is, for example, a substantially cylindrical electrolytic capacitor. The smoothing capacitors 88 are provided pairwise between the power bus bars 103*a*, 103*b*. Similarly to the X-capacitor 87, the smoothing capacitor 88 is arranged so that its central axis line is along the longitudinal direction of the base unit 54. From an end face of the smoothing capacitor 88 on the side of the motor drive unit 66, a pair of lead sections 88*a*, 88*b* extend in a substantially parallel manner. The pair of lead sections 88*a*, 88*b* are formed in a substantially crank-like shape when seen in a lateral view. Front ends of the lead sections 88*a*, 88*b* are arranged in the third bus bar opening 54*c*, and are joined to the power bus bars 103*a*, 103*b* by, for example, projection welding.

In an end face 88*c* of the smoothing capacitor 88 on the side opposite to the motor drive unit 66, there is provided a safety valve (not shown in the figures). The safety valve of the smoothing capacitor 88 is configured similarly to that of the X-capacitor 87. When an inner pressure of the smoothing capacitor 88 increases to a predetermined value or greater due to heating or the like, the inner pressure is released therethrough.

The choke coil 81 is provided mainly for suppressing radio noise. The choke coil 81 is formed by winding a conductive wire 83 around a cylindrical core 82 made of a magnetic material such as ferrite. It is provided between the power terminal bus bar 102*a* and the power bus bar 103*a*. In the core 82, a wiring start side of the conductive wire 83 is on the side of the motor drive unit 66 while a wiring end side of the conductive wire 83 is on the side opposite to the motor drive unit 66.

A first end 83*a* and a second end 83*b* of the conductive wire 83 of the choke coil 81 extend to the motor drive unit 66 in a substantially parallel manner so as to be along a central axis line of the core 82.

The first end 83*a* and the second end 83*b* of the conductive wire 83 are formed in a substantially crank-like shape when seen in a lateral view. They are arranged in the third bus bar opening 54*c*, and are joined to the power terminal bus bar 102*a* and the power bus bar 103*a* by, for example, projection welding.

When the choke coil 81 is formed, the conductive wire 83 is wound around the core 82 from the first end 83*a*. The second end 83*b* of the conductive wire 83 is bent on the winding end side of the core 82, and is led out to the side of the motor drive unit 66 (the winding start side of the core 82), which is a side opposite to the winding end side of the core 82. At this time, the conductive wire 83 is wound around in a coil-like shape. Therefore, onto the second end 83*b* of the conductive wire 83, the springback acts in the direction farther away from the first end 83*a* of the conductive wire 83. This causes the first end 83*a* and the second end 83*b* of the conductive wire 83 of the choke coil 81 to be positionally shifted. Therefore, it may be difficult to weld the conductive wire 83 onto the power terminal bus bar 102*a* and the power bus bar 103*a* with accuracy.

To address this, between the third bus bar opening 54*c* and the noise prevention element container 60*d*, there are provided a pair of guide grooves 61, 61 so as to be along the extension direction of the power terminal bus bar 102*a* and the power bus bar 103*a* in the third bus bar opening 54*c*. The pair of guide grooves 61, 61 are each formed by erecting a pair of walls 61*a*, 61*a*.

In the pair of guide grooves 61, 61, the first end 83*a* and the second end 83*b* of the conductive wire 83 are arrangeable, respectively. The first end 83*a* and the second end 83*b* of the conductive wire 83 are positioned by being arranged in the pair of guide grooves 61, 61. Therefore, it is possible to weld the conductive wire 83 of the choke coil 81 onto the power terminal bus bar 102*a* and the power bus bar 103*a* with ease and accuracy.

As shown in FIG. 3, the cover member 46 is fastened and fixed to the control device disposition section 40 with, for example, bolts 112. It covers the control device disposition section 40 and the control device 50 from outside in the axial direction.

The cover member 46 is made of a metal material such as iron (carbon steel), aluminum, or copper. Especially, it is desirable that the cover member 46 be made of aluminum, which is high in thermal conductivity, is light, and is inexpensive. The cover member 46 is formed in a substantially bathtub-like shape with: a circumferential wall 47, which is arranged in a rectangular frame corresponding to the control device disposition section 40 about the central axis O; and a bottom wall 48 that faces in the axial direction. Between the circumferential wall 47 of the cover member 46 and the control device disposition section 40, there is arranged an O-ring 99 over the whole circumference in the circumferential direction. The O-ring 99 is fitted into a ring groove 47*a* (see FIG. 2) that is formed in a front end surface of the circumferential wall 47 of the cover member 46. When the cover member 46 is fastened with the bolts 111, the O-ring 99 is pressed slightly flatter, to thereby exert sealing ability. This ensures the sealing ability between the control device disposition section 40 and the cover member 46.

In the bottom wall 48 of the cover member 46, there is provided a respiratory hole 45 that communicates between inside and outside of the housing 10. The respiratory hole 45 is for releasing pressure to the outside of the housing 10 in the case where the pressure in the housing 10 is higher than that of the outside of the housing 10 due to, for example, the expansion of air with an increase in temperature.

Furthermore, the respiratory hole 45 is provided at a position that faces a step surface 51*a* of the first main surface 51 of the control device 50 so as to avoid obstacles that prevent a respiratory function. This makes smooth the flow of a gas into the control device 50.

On an external surface of the bottom wall 48 of the cover member 46, a plurality of cooling fins 49 are formed integrally therewith. The cooling fins 49 dissipate the heat generated in the control device 50.

Here, as shown in FIG. 2, the motor drive unit 66 attached to the first main surface 51 of the control device 50 is configured to be in contact with an internal surface 48a of the bottom wall 48 of the cover member 46 via the heat dissipation sheet 68. As a result, the motor drive unit 66 transmits heat to the cover member 46 via the heat dissipation sheet 68. This allows the motor drive unit 66 to efficiently dissipate heat from the cooling fins 49 of the cover member 46.

Because the cover member 46 is fastened and fixed to the control device disposition section 40 of the housing 10, the heat generated in the control device 50 is dissipated via the cooling fins 49 of the cover member 46, and is also dissipated to and diffused in the aluminum housing 10, which is larger in volume than the cover member 46 and has high thermal conductivity. Therefore, it is possible to further enhance the cooing performance of the control device 50.

(Advantageous Effects of First Embodiment)

According to the first embodiment, the motor drive unit 66 is attached to the first main surface 51 of the base unit 54, and the motor control unit 71 is attached to the second main surface 52 of the base unit 54. Therefore, it is possible to make the first main surface 51 and the second main surface 52 of the base unit 54 smaller in area, and hence, to make the external shape of the base unit 54 smaller than the case where the motor drive unit 66 and the motor control unit 71 are attached to only either one of the first main surface 51 and the second main surface 52 of the base unit 54. Furthermore, a plurality of bus bars 100 are wired inside the base unit 54. Therefore, it is possible to make the external shape of the base unit 54 smaller and make the base unit 54 thinner than the case where, in the first main surface 51 and the second main surface 52 of the base unit 54, the bus bars 100 are wired while circumventing the motor drive unit 66 and the motor control unit 71. Accordingly, it is possible to make the electric motor 70 smaller in the axial direction and the radial direction.

The connector unit 58 is provided integrally on the second main surface 52 of the base unit 54 and is erected along the axial direction. Therefore, it is possible to arrange the connector unit 58 while preventing the bus bar unit main body 53 from being made larger in the radial direction. Consequently, it is possible to make the electric motor 70 further smaller in the radial direction. Furthermore, at this time, the opening of the connector unit 58 faces the bottom section 13 of the motor case 11. This allows a harness (not shown in the figures) led out from the external power source (not shown in the figures) to be connected to the connector unit 58 from the side of the bottom section 13 of the motor case 11. Accordingly, it is possible to prevent interference between the connector unit 58 and the peripheral equipment.

The space above the first main surface 51 on the side opposite to the connector unit 58 across the base unit 54 is a dead space. Therefore, this dead space can be effectively utilized by providing thereon the X-capacitor 87, the smoothing capacitors 88, 88, and the choke coil 81 as the noise prevention elements 80.

Accordingly, it is possible to prevent the electric motor 70 from being made larger when the bus bar unit main body 53 is provided with the noise prevention elements 80.

The cover member 46 is made of a metal material, especially, an aluminum material. This allows the cover member 46 to have high thermal conductivity. Furthermore, because connected to the cover member 46 via the heat dissipation sheet 68, the motor drive unit 66 is capable of transmitting the heat generated in the motor drive unit 66 to the cover member 46, allowing the heat to be dissipated from the cover member 46 to the outside of the electric motor 70. Therefore, it is possible to form an electric motor 70 with excellent heat dissipation ability.

In addition, because the cover member 46 is fastened and fixed to the control device disposition section 40 of the housing 10, the heat generated in the control device 50 is dissipated from the cooling fins 49 of the cover member 46, and is also dissipated to and diffused in the aluminum housing 10, which is larger in volume than the cover member 46 and has high thermal conductivity. Therefore, it is possible to further enhance the cooing performance of the control device 50.

The electric motor 70, which is downsizable, is provided as a drive source of the pump unit 90. Therefore, it is possible to form a small electric pump 1.

(Second Embodiment)

Subsequently an electric motor 70 according to a second embodiment will be described.

Figure 9:
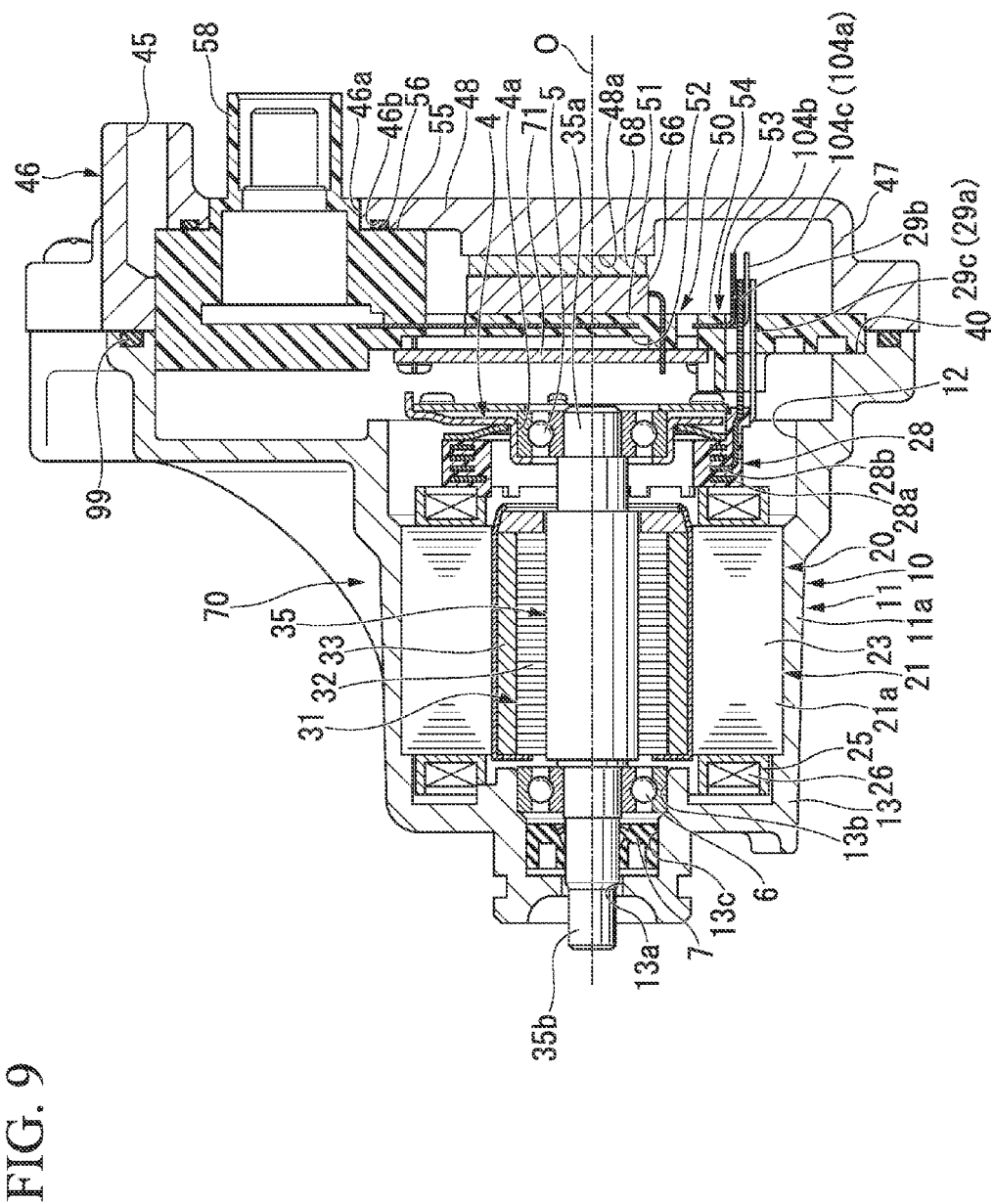
FIG. 9 is a lateral cross-sectional view of an electric motor according to a second embodiment including its central axis.

FIG. 9 is a lateral cross-sectional view of an electric motor 70 according to the second embodiment including its central axis O.

The electric motor 70 of the first embodiment has the connector unit 58 erected from the second main surface 52 of the base unit 54 toward the bottom section 13 of the motor case 11 (see FIG. 2).

The electric motor 70 of the second embodiment is different from that of the first embodiment in that the connector unit 58 is erected from the first main surface 51 of the base unit 54 toward a side opposite to the bottom section 13 of the motor case 11, as shown in FIG. 9. Detailed description of the constituent parts similar to those of the first embodiment will be omitted, and only different parts will be described.

As shown in FIG. 9, the electric motor 70 of the second embodiment includes a cover member 46 that covers a control device disposition section 40 and a control device 50 from outside in the axial direction. In the cover member 46, a through-hole 46a is formed at a position corresponding to a connector unit 58 erected from a first main surface 51 of a base unit 54. The connector unit 58 is led out to the outside of a housing 10 through the through-hole 46a. To a rotation shaft 35 that protrudes from a bottom section 13 of the electric motor 70, there is connected a pump unit (not shown in the figures) that is provided as a separate entity. As a result, the electric motor 70 of the second embodiment is used as a drive source of the pump unit.

Here, on the first main surface 51 of the base unit 54, a seal face 55 is formed around a base end of the connector unit 58. Between the seal face 55 of the base unit 54 and an internal surface 48a of a bottom wall 48 of the cover member 46, there is sandwiched a sealing member 56 disposed annularly around the connector unit 58. The sealing member 56 is fitted into a ring groove 46b that is formed so as to surround the through-hole 46a of the cover member 46. The sealing member 56 is pressed slightly flatter by the seal face 55 of the base unit 54. As a result, the sealing member 56 ensures the sealing ability around the connector unit 58, and prevents the water, which has infiltrated from the gap between the connector unit 58 and the through-hole 46a of the cover member 46, from moving outer than the sealing member 56.

(Advantageous Effects of Second Embodiment)

According to the second embodiment, the connector unit 58 is erected from the first main surface 51 of the base unit 54 along the axial direction. Therefore, it is possible to arrange the connector unit 58 while the bus bar unit main body 53 is prevented from being made larger in the radial direction. At this time, the opening of the connector unit 58 is directed outer in the axial direction than the cover member 46. Therefore, it is possible for a harness (not shown in the figures) led out from an external power source (not shown in the figures) to be connected to the connector unit 58 from an outer side in the axial direction than the cover member 46.

Consequently, it is possible to prevent water from infiltrating from the connector unit 58 into the housing 10, and also to make the electric motor 70 further smaller in the radial direction.

(Third Embodiment)

Subsequently, a third embodiment will be described. Detailed description of the constituent parts similar to those of the first embodiment and the second embodiment will be omitted, and only different parts will be described.

Figure 10:
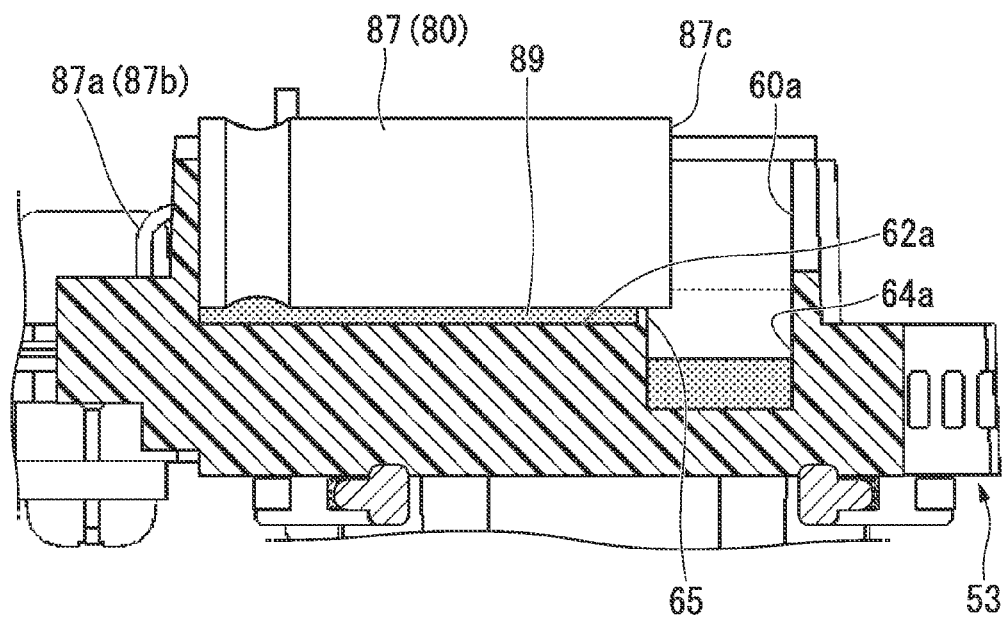
FIG. 10 is a cross-sectional view of FIG. 5, taken along the B-B line.

FIG. 10 is a cross-sectional view of FIG. 5, taken along the B-B line.

As shown in FIG. 10, an X-capacitor 87 is fixed to a bottom section 62a of a noise prevention element container 60a via an adhesive 89.

The adhesive 89 is mainly based on, for example, silicone, and has high thermal conductivity. As a result, even if the X-capacitor 87 generates heat, it is possible to exert excellent heat dissipation performance.

The material of the adhesive 89 is not limited to silicone. A material excellent in heat dissipation performance is favorably used.

The adhesive 89 has excellent wet-spreadability and adhesiveness to an insulating material used for a bus bar unit main body 53 (for example, a resin material such as PBT (polybutylene terephthalate)) and to a surface of the X-capacitor 87. As a result, it is possible to prevent the adhesive 89 from being detached from the bottom section 62a of the noise prevention element container 60a and the X-capacitor 87. Therefore, it is possible to ensure excellent resistance to vibration and heat dissipation performance.

Here, in the bottom section 62a of the noise prevention element container 60a, there is formed a recess section 64a, which is recessed in a direction of being spaced away from an end face 87c (a downward direction in FIG. 10), at a position corresponding to a safety valve of the X-capacitor 87. At a border between the bottom section 62a and the recess section 64a of the noise prevention element container 60a, there is provided a wall section 65 for restricting a predetermined application range of the adhesive applied onto the bottom section 62a of the noise prevention element container 60a. An application amount and an application position of the adhesive 89 is controlled in the manufacturing process. However, there are cases where a slight change in the way the X-capacitor 87 is installed or in the position of the X-capacitor 87 in the noise prevention element container 60a causes the adhesive 89 to spill into the outside of the predetermined application range of the noise prevention element container 60a. The recess section 64a is configured to receive the spilled adhesive 89. The amount of recess (namely, the depth) of the recess section 64a is determined according to the amount of application of the adhesive 89. To be more specific, the amount of recess of the recess section 64a is set to a volume capable of containing a quantity of the adhesive 89 that, after the application of the adhesive 89 to the bottom section 62a of the noise prevention element container 60a in the manufacturing process, spills from the bottom section 62a of the noise prevention element container 60a when the X-capacitor 87 is inserted into the noise prevention element container 60a. This volume is set so as to be capable of receiving the adhesive 89 spilled from the bottom section 62a even if the adhesive 89 has reached the level denoted with a broken line in FIG. 9. As a result, it is possible to securely prevent the adhesive 89 from being attached to the safety valve of the X-capacitor 87. Thus, the function of the safety valve will not be obstructed.

As shown in FIG. 5, similarly to the X-capacitor 87, the smoothing capacitors 88 are fixed respectively to the bottom sections of the noise prevention element containers 60b, 60c via the adhesive 89 (see FIG. 10). The structure, action, and effect of the adhesive 89 are as described above, and hence, will not be repetitiously explained.

Furthermore, also in the bottom sections of the noise prevention element containers 60b, 60c, there are formed recess sections 64b, 64c, which are recessed in the direction of being spaced away from the end face 87c, respectively at positions corresponding to the safety valves of the smoothing capacitors 88. The structures, actions, and effects of the recess sections 64b, 64c are the same as that of the recess section 64a described above, and hence, will not be repetitiously explained.

(Advantageous Effects of Third Embodiment)

According to the third embodiment of the present invention, it is possible to obtain the following effects in addition to the effects obtained in the first embodiment and the second embodiment.

Namely, according to the third embodiment, the signal-system terminal bus bars 101a to 101d and power terminal bus bars 102a, 102b that protrude from the connector unit 58 are molded in the connector unit 58 (in the base unit 54) while the connector unit 58 is led out to the outside of the housing 10 through the through-hole 43, and the sealing member 56, which is disposed annularly around the connector unit 58, is sandwiched between the seal face 55 and the flange section 42 of the housing 10. This makes it possible to prevent the water, which has infiltrated from the gap between the connector unit 58 and the through-hole 43, from moving outer than the sealing member 56. Therefore, it is possible to prevent water from infiltrating from the connector unit 58 into the housing 10, thus ensuring the waterproofness of the electric motor 70.

The collar members 57a, 57b for fixing the bus bar unit main body 53 to the housing 10 with the bolts 111 are uniformly arranged around the connector unit 58. Therefore, when the bus bar unit main body 53 is fixed to the control device disposition section 40 of the housing 10, it is possible to sandwich the sealing member 56, which is interposed between the housing 10 and the seal face 55 of the base unit 54, between the housing 10 and the base unit 54 in a state of being uniformly pressed around the connector unit 58.

Consequently, it is possible to securely prevent water from infiltrating from the connector unit 58 into the housing 10, and hence, to ensure high waterproofness of the electric motor 70.

Furthermore, the electric motor 70, which is capable of preventing water from infiltrating from the connector unit 58 into the housing 10, is provided as a drive source of the pump unit 90. Therefore, it is possible to form an electric pump 1 that is capable of preventing water from infiltrating from the connector unit 58 into the housing 10, and hence, of ensuring waterproofness.

(Fourth Embodiment)

Subsequently, a fourth embodiment will be described. Detailed description of the constituent parts similar to those of the first embodiment, the second embodiment, and the third embodiment will be omitted, and only different parts will be described.

Figure 11:
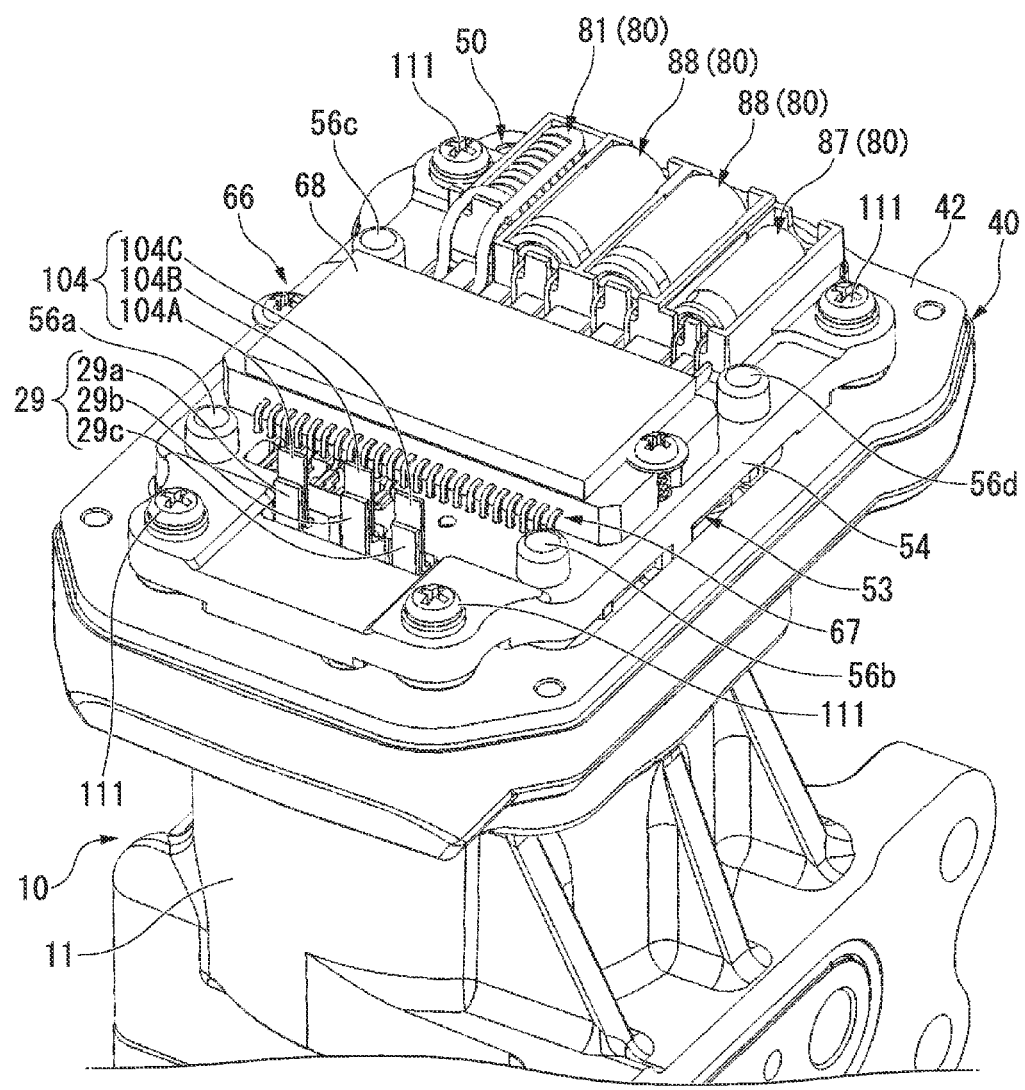
FIG. 11 is a perspective view of a control device attached to a control device disposition section.

FIG. 11 is a perspective view of a control device 50 attached to a control device disposition section 40. In FIG. 11, illustration of the cover member 46 (see FIG. 3) is omitted.

As shown in FIG. 11, when the control device 50 is attached to the control device disposition section 40, drive terminals 104A to 104C and feed terminals 29a to 29c are arranged and connected so as to overlap each other in the thickness direction. At this time, the feed terminals 29a to 29c are arranged on an outer side (a side opposite to a motor drive unit 66) while the drive terminals 104A to 104C are arranged on an inner side (a side of the motor drive unit 66). In the following description, the side of the feed terminals 29a to 29c in the overlapping direction of the drive terminals 104A to 104C and the feed terminals 29a to 29c is referred to as "forward" while the side of the drive terminals 104A to 104C is referred to as "rearward." A direction orthogonal to the overlapping direction and the extension direction is referred to as "width direction."

Figure 12:
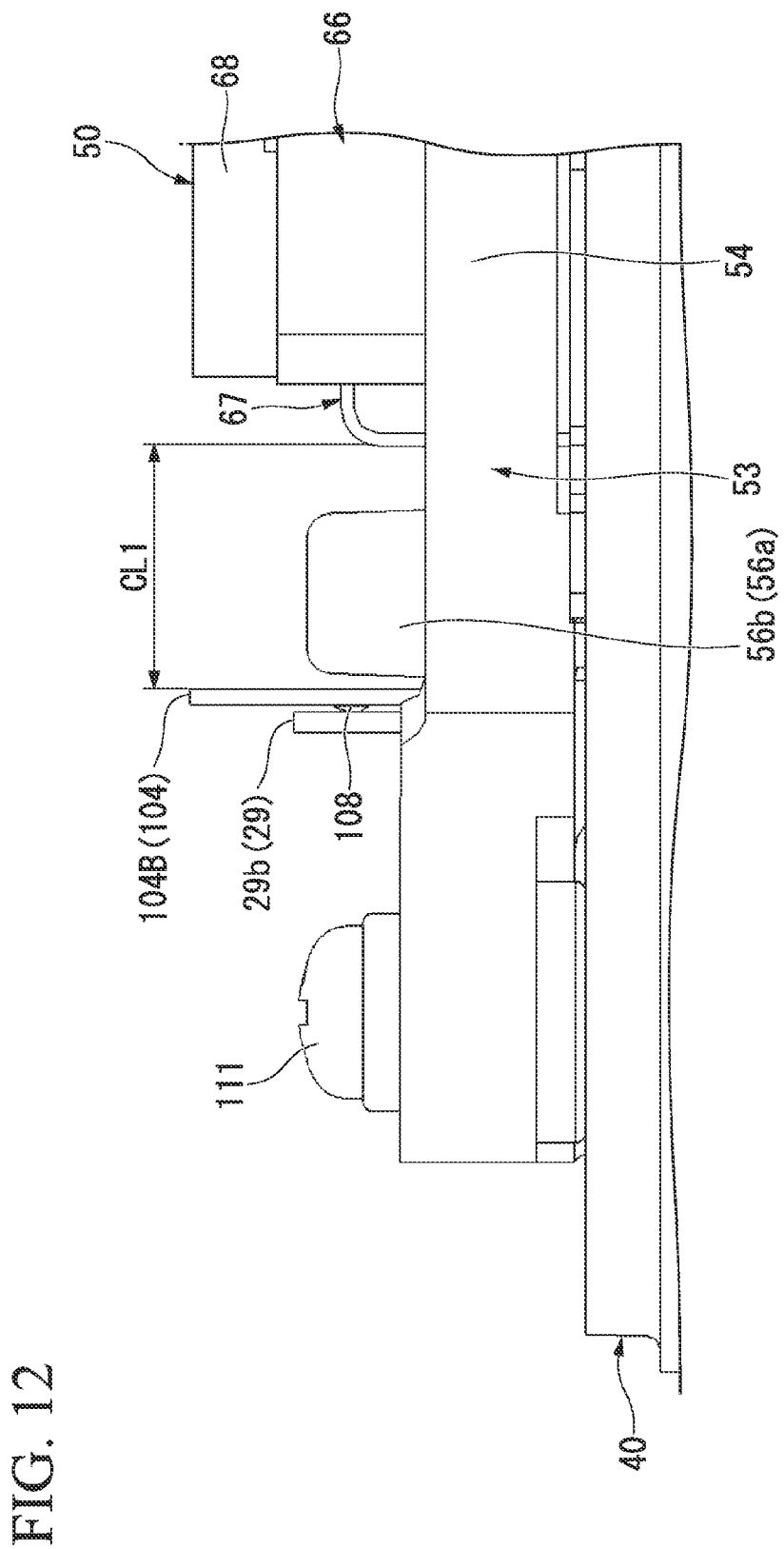
FIG. 12 is an explanatory diagram of terminals when seen in a width direction (lateral direction).
Figure 13:
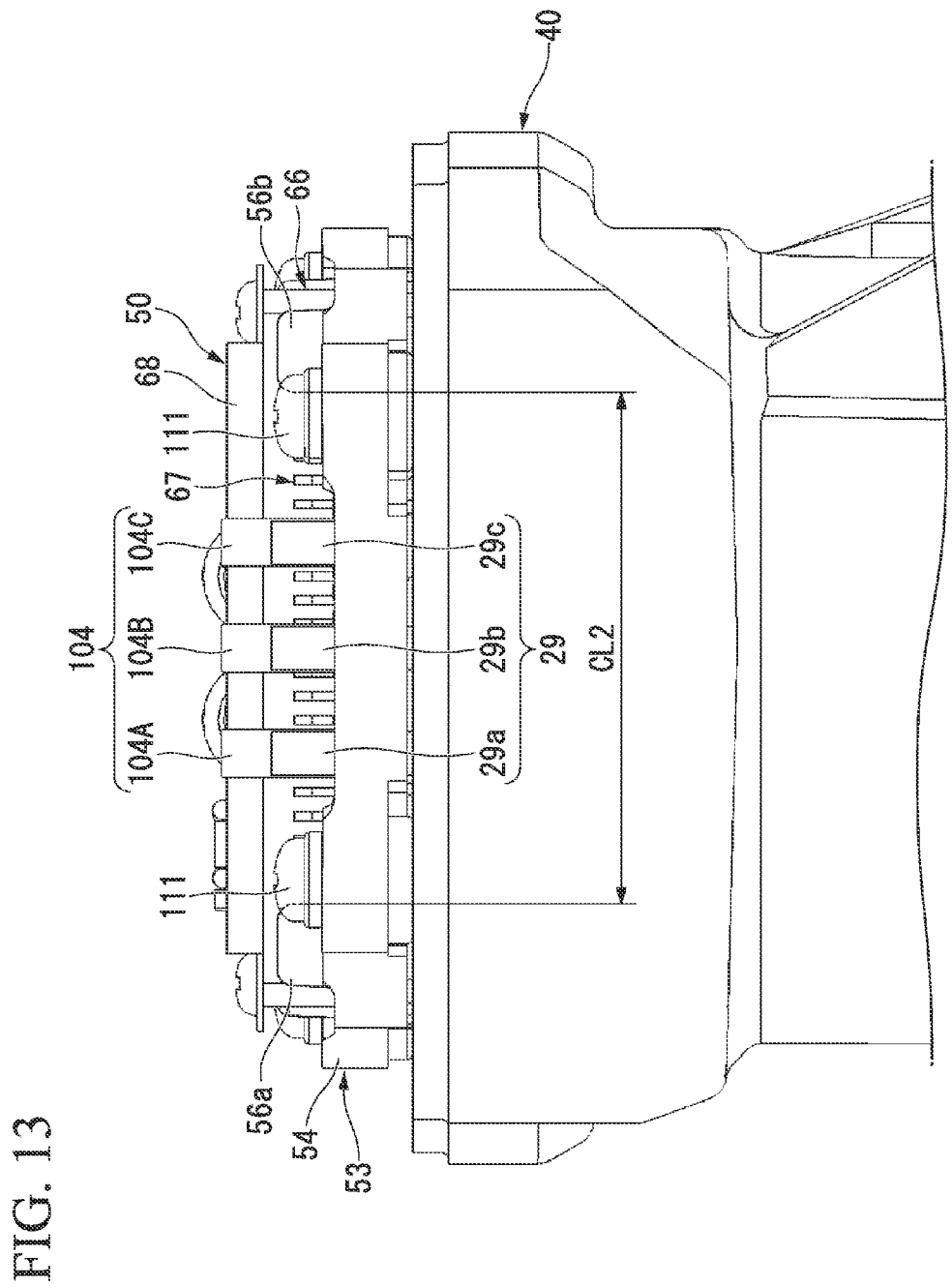
FIG. 13 is an explanatory diagram of the terminals when seen in an overlapping direction.

FIG. 12 is an explanatory diagram of the terminals (only the feed terminal 29b and the drive terminal 104B are shown) when seen in the width direction (lateral direction). FIG. 13 is an explanatory diagram of the terminals (the feed terminals 29a to 29c and the drive terminals 104A to 104C) when seen from forward in the overlapping direction. In FIG. 12, for the sake of simplicity, out of the feed terminals 29a to 29c and the drive terminals 104A to 104C (see FIG. 11 for both), only the feed terminal 29b for V phase and the drive terminal 104B for V phase are illustrated, and the other terminals, namely, the feed terminals 29a, 29c and the drive terminals 104A, 104C (see FIG. 11 for these) are omitted. Because the positional relationship among the feed terminals 29a to 29c and the drive terminals 104A to 104C is the same, only the feed terminal 29b for V phase and the drive terminal 104B for V phase will be described below, and the description of the other terminals, namely, the feed terminals 29a, 29c and the drive terminals 104A, 104C will be omitted.

As shown in FIG. 12, a front end of the drive terminal 104B protrudes further than a front end of the feed terminal 29b. As a result, as shown in FIG. 13, when the feed terminal 29b and the drive terminal 104B are seen in the overlapping direction, the drive terminal 104B is exposed on a front end side of the feed terminal 29b.

Namely, the feed terminal 29b and the drive terminal 104B are configured so that, when they are seen in the overlapping direction, the drive terminal 104B is seen behind the feed terminal 29b on the front end side of the feed terminal 29b.

Furthermore, as shown in FIG. 12, behind the feed terminal 29b, the motor drive unit 66 is provided via a predetermined clearance CL1.

On a surface of the drive terminal 104B on the side of the feed terminal 29b, there is formed a protrusion section 108 that protrudes toward the feed terminal 29b. The protrusion section 108 is provided for joining the drive terminal 104B and the feed terminal 29b together by projection welding.

As shown in FIG. 5, the second ends of the three-phase bus bars 104A to 104C are arranged in parallel with the ends of the power bus bars 103a, 103b, and are exposed from the second bus bar opening 54b.

As shown in FIG. 4, the ground terminal 105 is a terminal for securing a ground of the supply circuit. At a position corresponding to the flange section 42 (see FIG. 3) of the motor case 11, the ground terminal 105 is exposed to the outside from the second main surface 52 of the bus bar unit main body 53 through the ground terminal opening 54d. The ground terminal 105 includes: an annular fixation unit 105a; and an extension section 105b that extends from the power terminal bus bar 102b on the negative electrode side toward the fixation unit 105a. The ground terminal 105 is made of a metal material such as copper and is formed integrally on the power terminal bus bar 102b on the negative electrode side. A fixation unit 105a of the ground terminal 105 is fastened and fixed to the flange section 42 (see FIG. 2) of the motor case 11 with a ground bolt (not shown in the figures). The ground terminal 105 made of copper is fastened and fixed directly to the flange section 42. Therefore, it is possible to secure the ground of the supply circuit with a low value of resistance.

As shown in FIG. 5, in an area of the first main surface 51 of the base unit 54 that corresponds to the disposition opening 41 (see FIG. 3) of the control device disposition section 40, the motor drive unit 66 is attached with, for example, self-tapping screws 66a. The motor drive unit 66 is formed in a substantially rectangular shape when seen in a planar view. Into the motor drive unit 66, switching elements such as FETs (Field Effect Transistors) and IGBTs (Insulated Gate Bipolar Transistors) are built.

At four corners on an outer circumferential side of the motor drive unit 66, in the first main surface 51 of the base unit 54, there are provided protrusion sections 56a to 56d integrally on the base unit 54. The protrusion sections 56a to 56d are for receiving screws 173 (see FIG. 4) that are used for fixing the multilayered substrate 72 (see FIG. 4), which will be described later. The protrusion sections 56a, 56b are provided at positions that sandwich the second bus bar opening 54b while the protrusion sections 56c, 56d are provided at positions that sandwich the third bus bar opening 54c.

In a first surface of the motor drive unit 66 on the side of the first bus bar opening 54a, there are provided a terminal row 67. Some terminals in the terminal row 67 are formed in a substantially L-shape. They extend from the first main surface 51 of the base unit 54 toward the second main surface 52 via through-holes 54e, and their ends 67A (see FIG. 4) protrude from the second main surface 52. Of the terminals in the terminal row 67, three three-phase terminals 67a, 67b, 67c are formed in a substantially crank-like shape, and are electrically connected respectively to second ends of the three-phase bus bars 104a to 104c that are exposed from the second bus bar opening 54b. Of the terminals in the terminal row 67, two power terminals 67d, 67e are formed in a substantially crank-like shape, and are connected respectively to ends of the power bus bars 103a, 103b that are exposed from the second bus bar opening 54b.

The motor drive unit 66 converts a direct current that has been input from the power terminals 67d, 67e to a three-phase alternating current, and then output the converted current from the three-phase terminals 67a, 67b, 67c.

To an external main surface of the motor drive unit 66, there is attached a heat dissipation sheet 68 made of, for example, silicone rubber.

As shown in FIG. 4, in an area of the second main surface 52 of the base unit 54 that corresponds to disposition opening 41 (see FIG. 3) of the control device disposition section 40, there is formed a recess section 52a that is further back from the rest of the surface.

At a position corresponding to the recess section 52a, the motor control unit 71 is arranged. As the motor control unit 71, a substantially rectangular plate-like multilayered substrate 72 on which electronic elements (not shown in the figures) are contained is used. The multilayered substrate 72 is made of, for example, glass epoxy in which wiring patterns are printed. In the multilayered substrate 72 of the motor control unit 71, there are formed a plurality of through-holes 72*b*, through which second ends of the signal-system terminal bus bars 101*a* to 101*d* erected from the second main surface 52, parts of the power bus bars 103*a*, 103*b* (see FIG. 5) (referred to generically as "protruded terminals 100*a* of the bus bars 100"), and ends 67A of the terminal row 67 of the motor drive unit 66 are to be inserted. The multilayered substrate 72 is fixed to the second main surface 52 (protrusion sections 56*a* to 56*d*) of the base main body 165 with a plurality of screws 173.

As shown in FIG. 2, at a site of the second main surface 52 of the base unit 54 that corresponds to the flange section 42 of the housing 10, there is erected a connector unit 58 from the second main surface 52 toward the bottom section 13 of the housing 10 along the axial direction. As shown in FIG. 4, the connector unit 58 has a substantially rectangular opening. Inside the opening, there are arranged first ends of the signal-system terminal bus bars 101*a* to 101 *d* and first ends of the power terminal bus bars 102*a*, 102*b* (see FIG. 5). As shown in FIG. 3, when the control device 50 is attached to the control device disposition section 40, the connector unit 58 is led out to the outside of the housing 10 through the through-hole 43 of the flange section 42.

As shown in FIG. 4, on the second main surface 52 of the base unit 54, a seal face 55 is formed around a base end of the connector unit 58. The seal face 55 is formed on a flat plane that is orthogonal to the central axis O (see FIG. 2). As shown in FIG. 3, between the seal face 55 of the base unit 54 and the flange section 42 of the housing 10, there is sandwiched a sealing member 56 that is disposed annularly around the connector unit 58. The sealing member 56 is an annular O-ring. The sealing member 56 is fitted into a ring groove 44 that is formed so as to surround the through-hole 43 of the flange section 42. Furthermore, the sealing member 56 is pressed slightly flatter by the seal face 55 of the base unit 54. As a result, the sealing member 56 ensures the sealing ability around the connector unit 58, and prevents the water, which has infiltrated from the gap between the connector unit 58 and the through-hole 43 of the flange section 42, from moving outer than the sealing member 56.

As shown in FIG. 5, in the control device 50, pipe-like collar members 57*a* to 57*d* made of a metal material are insert-molded in its four corners. Each of the collar members 57*a* to 57*d* includes: a cylindrical collar main body 57*e*; and a flange section 57*f* that is provided at an end of the collar main body 57*e* in the axial direction. Each of the collar members 57*a* to 57*d* are provided so that the flange section 57*f* is on the second main surface 52 of the base unit 54. As shown in FIG. 3, with each of the collar members 57*a* to 57*d* being fastened to the control device disposition section 40 by the insertion of the bolt 111 therethrough, the control device 50 is joined integrally to an end of the motor case 11 on the side of the opening section 12 in the axial direction. Here, the flange section 57*f* (see FIG. 4) of each of the collar members 57*a* to 57*d* makes it possible to increase the contact area (flange area) between each of the collar members 57*a* to 57*d* and the control device disposition section 40, thus improving the fastening power between the two.

Between the collar members 57*c*, 57*d*, which are provided on the side of the motor drive unit 66, out of the collar members 57*a* to 57*d*, there is formed a step surface 51*a* that is a stepwise lower than the surface on which the collar members 57*c*, 57*d* are disposed.

As shown in FIG. 5, the space above the first main surface 51 opposite to the connector unit 58 across the base unit 54 is a dead space. In this site, there are provided a plurality of noise prevention elements 80 that constitute the control device 50. The noise prevention elements 80 include, for example: an X-capacitor 87; smoothing capacitors 88, 88; and a choke coil 81. The X-capacitor 87, the smoothing capacitors 88, 88, and the choke coil 81 are respectively contained in noise prevention element containers 60*a* to 60*d*, which are each formed in a substantially bathtub-like shape on the first main surface 51.

The X-capacitor 87 is provided mainly for suppressing radio noise. The X-capacitor 87 is, for example, a substantially cylindrical electrolytic capacitor, and is provided between the power terminal bus bars 102*a*, 102*b*. The X-capacitor 87 is arranged so that its central axis line is along a longitudinal direction of the base unit 54. From an end face of the X-capacitor 87 on the side of the motor drive unit 66, a pair of lead sections 87*a*, 87*b* extend in a substantially parallel manner. The pair of lead sections 87*a*, 87*b* are formed in a substantially crank-like shape when seen in a lateral view. Front ends of the lead sections 87*a*, 87*b* are arranged in the third bus bar opening 54*c*, and are joined to the power terminal bus bars 102*a*, 102*b* by, for example, projection welding.

The smoothing capacitor 88 is provided for suppressing the variation in voltage that arises with the drive of the brushless motor 20 (see FIG. 2). Similarly to the X-capacitor 87, the smoothing capacitor 88 is, for example, a cylindrical electrolytic capacitor. The smoothing capacitors 88 are provided pairwise between the power bus bars 103*a*, 103*b*. Similarly to the X-capacitor 87, the smoothing capacitor 88 is arranged so that its central axis line is along the longitudinal direction of the base unit 54. From an end face of the smoothing capacitor 88 on the side of the motor drive unit 66, a pair of lead sections 88*a*, 88*b* extend in a substantially parallel manner. The pair of lead sections 88*a*, 88*b* are formed in a substantially crank-like shape when seen in a lateral view. Front ends of the lead sections 88*a*, 88*b* are arranged in the third bus bar opening 54*c*, and are joined to the power bus bars 103*a*, 103*b* by, for example, projection welding.

The choke coil 81 is provided mainly for suppressing radio noise. The choke coil 81 is formed by winding a conductive wire 83 around a cylindrical core 82 made of a magnetic material such as ferrite. It is provided between the power terminal bus bar 102*a* and the power bus bar 103*a*. In the core 82, a wiring start side of the conductive wire 83 is on the side of the motor drive unit 66 while a wiring end side of the conductive wire 83 is on the side opposite to the motor drive unit 66.

A first end 83*a* and a second end 83*b* of the conductive wire 83 of the choke coil 81 extend to the motor drive unit 66 in a substantially parallel manner so as to be along a central axis line of the core 82.

The first end 83*a* and the second end 83*b* of the conductive wire 83 are formed in a substantially crank-like shape when seen in a lateral view. They are arranged in the third bus bar opening 54*c*, and are joined to the power terminal bus bar 102*a* and the power bus bar 103*a* by, for example, projection welding.

As shown in FIG. 3, the cover member 46 is fastened and fixed to the control device disposition section 40 with, for example, the bolts 112. It covers the control device disposition section 40 and the control device 50 from outside in the axial direction.

The cover member 46 is made of a metal material such as iron (carbon steel), aluminum, or copper. Especially, it is desirable that the cover member 46 be made of aluminum, which is high in thermal conductivity, is light, and is inexpensive. The cover member 46 is formed in a substantially bathtub-like shape with: a circumferential wall 47, which is arranged in a rectangular frame corresponding to the control device disposition section 40 about the central axis O; and a bottom wall 48 that faces in the axial direction. Between the circumferential wall 47 of the cover member 46 and the control device disposition section 40, there is arranged an O-ring 99 over the whole circumference in the circumferential direction. The O-ring 99 is fitted into a ring groove 47a (see FIG. 2) that is formed in a front end surface of the circumferential wall 47 of the cover member 46. When the cover member 46 is fastened with the bolts 112, the O-ring 99 is pressed slightly flatter, to thereby exert sealing ability. This ensures the sealing ability between the control device disposition section 40 and the cover member 46.

In the bottom wall 48 of the cover member 46, there is provided a respiratory hole 45 that communicates between inside and outside of the housing 10. The respiratory hole 45 is for releasing pressure to the outside of the housing 10 in the case where the pressure in the housing 10 is higher than that of the outside of the housing 10 due to, for example, the expansion of air with an increase in temperature. Furthermore, the respiratory hole 45 is provided at a position that faces a step surface 51a of the first main surface 51 of the control device 50 so as to avoid obstacles that prevent a respiratory function. This makes smooth the flow of a gas into the control device 50.

On an external surface of the bottom wall 48 of the cover member 46, a plurality of cooling fins 49 are formed integrally therewith. The cooling fins 49 dissipate the heat generated in the control device 50.

Here, as shown in FIG. 2, the motor drive unit 66 attached to the first main surface 51 of the control device 50 is configured to be in contact with an internal surface 48a of the bottom wall 48 of the cover member 46 via the heat dissipation sheet 68. As a result, the motor drive unit 66 transmits heat to the cover member 46 via the heat dissipation sheet 68. This allows the motor drive unit 66 to efficiently dissipate heat from the cooling fins 49 of the cover member 46.

Because the cover member 46 is fastened and fixed to the control device disposition section 40 of the housing 10, the heat generated in the control device 50 is dissipated via the cooling fins 49 of the cover member 46, and is also dissipated to and diffused in the aluminum housing 10, which is larger in volume than the cover member 46 and has high thermal conductivity. Therefore, it is possible to further enhance the cooing performance of the control device 50.

(Methods of Welding Feed Terminals and Drive Terminals Together)

Figure 14:
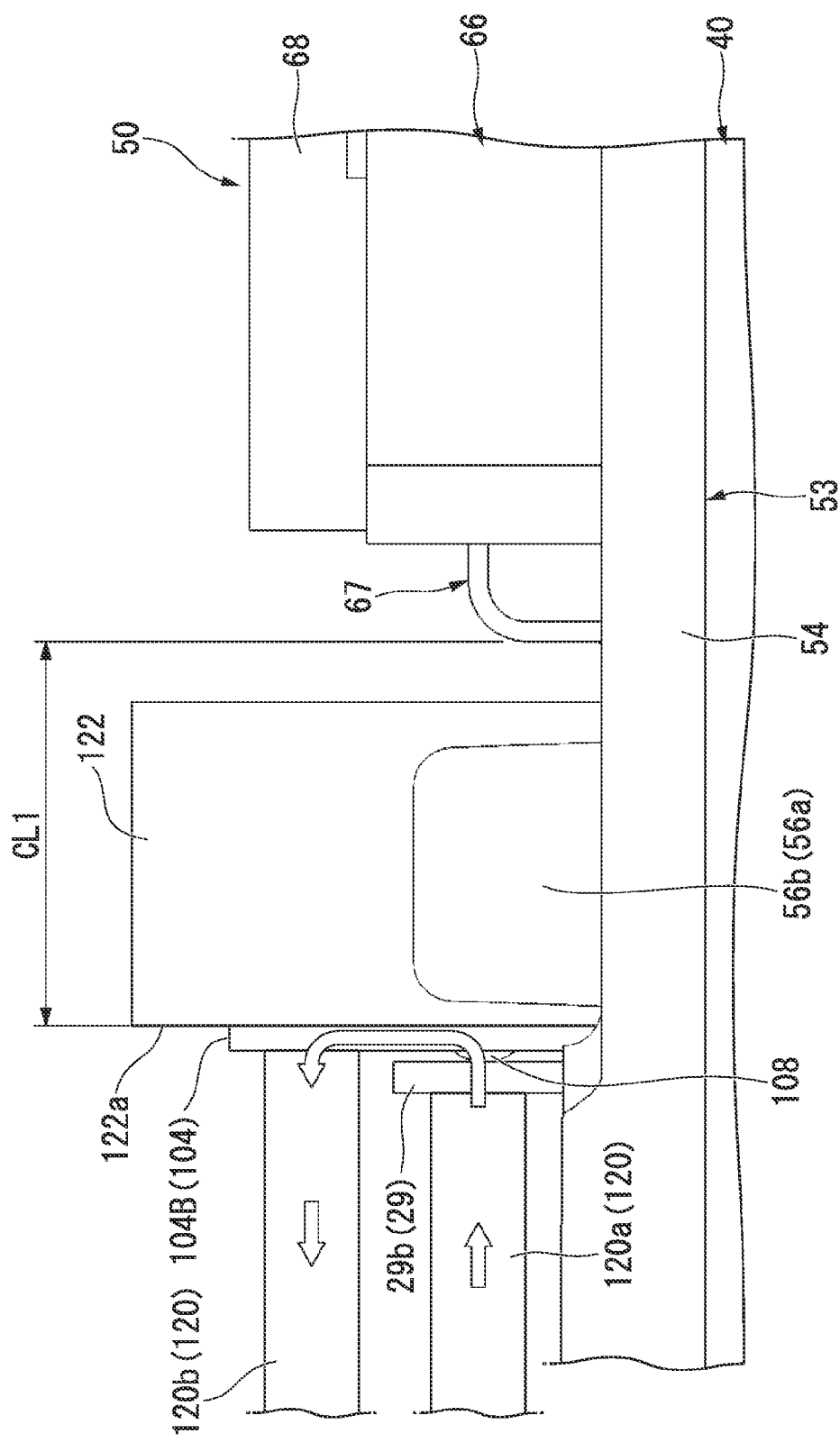
FIG. 14 is an explanatory diagram of a welding operation when seen in the width direction (lateral direction).
Figure 15:
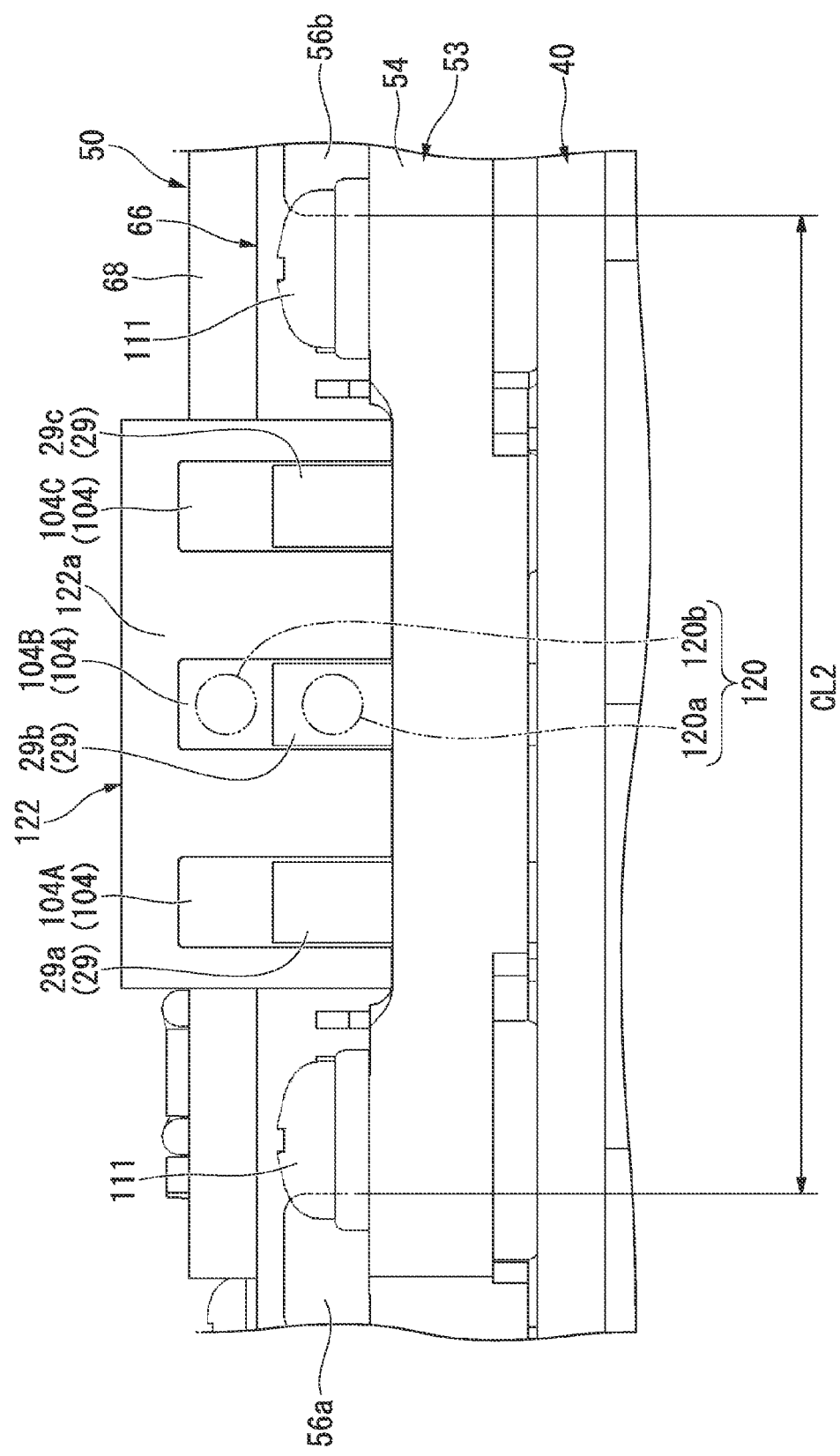
FIG. 15 is an explanatory diagram of the welding operation when seen in the overlapping direction.

Hereunder is a description of methods of welding the feed terminals 29a to 29c and the drive terminals 104A to 104C together, with reference to FIG. 14 and FIG. 15.

FIG. 14 is an explanatory diagram of a welding operation when seen in the width direction (lateral direction). FIG. 15 is an explanatory diagram of a welding operation when seen in the overlapping direction. In FIG. 14, for the sake of simplicity, out of the feed terminals 29a to 29c and the drive terminals 104A to 104C, only the feed terminal 29b for V phase and the drive terminal 104B for V phase are illustrated, and the other terminals, namely, the feed terminals 29a, 29c and the drive terminals 104A, 104C are omitted.

Because the methods of welding the feed terminals 29a to 29c and their corresponding drive terminals 104A to 104C together are similar, only the method of welding the feed terminal 29b for V phase and the drive terminal 104B for V phase together will be described below, and the methods of welding the feed terminals 29a, 29c and the drive terminals 104A, 104C together will be omitted.

As shown in FIG. 14, the feed terminal 29b and the drive terminal 104B are joined by projection welding. The projection welding between the feed terminal 29b and the drive terminal 104B is carried out by use of: a pair of electrode bars 120 made of a main electrode bar 120a and a sub electrode bar 120b; and a restraining jig 122.

The pair of electrode bars 120 are round rod-like general-purpose electrode bars made of, for example, an alloy material of copper and tungsten. The main electrode bar 120a is connected to a positive side of a power source (not shown in the figures). From forward in the overlapping direction (from left in FIG. 14), a front end of the main electrode bar 120a is brought into abutment with a main surface of the feed terminal 29b at a position corresponding to the protrusion section 108 of the drive terminal 104B. The sub electrode bar 120b is connected to the negative side of the power source (not shown in the figures). From forward in the overlapping direction (from left in FIG. 14), a front end of the sub electrode bar 120b is brought into abutment with a main surface of the drive terminal 104B that is exposed on the front end side of the feed terminal 29b.

The restraining jig 122 is a cuboid member, which is made of, for example, a metal material such as stainless steel, a resin material, or other material. In the restraining jig 122, a dimension along an overlapping direction is less than the clearance CL1 between the feed terminal 29b and the terminal row 67 of the motor drive unit 66. As a result, with a front surface 122a of the restraining jig 122 in the overlapping direction being in contact with the drive terminal 104B, it is possible to arrange the restraining jig 122 between the drive terminal 104B and the motor drive unit 66. Furthermore, as shown in FIG. 15, in the restraining jig 122, a dimension along the width direction is less than a width dimension CL2 between the pair of protrusion sections 56a, 56b located on the side of the first bus bar opening 54a (see FIG. 5).

Although not illustrated in detail, so as to allow for abutment with the drive terminals 104A to 104C, the front surface 122a of the restraining jig 122 is formed in a step-like shape in which the central portion is recessed by the aforementioned amount of offset of the drive terminal 104B when seen in the axial direction. The front surface 122a of the restraining jig 122 is configured to be brought into contact simultaneously with the drive terminals 104A to 104C. At both ends of the front surface 122a of the restraining jig 122 in the width direction, protection walls are integrally provided for preventing the sputter at the time of welding from scattering onto the motor drive unit 66 or the like.

The welding between the feed terminal 29b and the drive terminal 104B is carried out as follows.

As shown in FIG. 14, firstly the restraining jig 122 is arranged between the drive terminal 104B and the motor drive unit 66. In a state with the front surface 122a of the restraining jig 122 being in abutment with the drive terminal 104B, the restraining jig 122 is fixed by use of fixation jigs (not shown in the figures). With the restraining jig 122, the rearward movement of the feed terminal 29b and the drive terminal 104B in the overlapping direction is restricted.

Subsequently, from forward in the overlapping direction, the front end of the main electrode bar 120*a* is brought into abutment with the main surface of the feed terminal 29*b* at a position corresponding to the protrusion section 108 of the drive terminal 104B. Furthermore, from forward in the overlapping direction (left in FIG. 14), the front end of the sub electrode bar 120*b* is brought into abutment with the main surface of the drive terminal 104B that is exposed on the side of the front end of the feed terminal 29*b*. At this time, the step surface 51*a*, which is formed between the collar members 57*c*, 57*d* on the first main surface 51 of the base unit 54, is configured to function also as an evacuation section that does not obstruct a forward-rearward movement of the main electrode bar 120*a*. As a result, it is possible to bring the main electrode bar 120*a* into abutment with the main surface of the feed terminal 29*b* without contacting the base unit 54.

Subsequently, the main electrode bar 120*a* is pressed from forward to rearward (from left to right in FIG. 14). While the feed terminal 29*b* is being pressed with a predetermined load toward the drive terminal 104B, a predetermined voltage is applied between the main electrode bar 120*a* and the sub electrode bar 120*b*. As a result, a high current is passed between the feed terminal 29*b* and the drive terminal 104B, thereby welding these terminals together. Thus, the projection welding between the feed terminal 29*b* and the drive terminal 104B is completed.

Although not illustrated in detail, the number of pairs of main electrode bar 120*a* and sub electrode bar 120*b* is equal to the number of welding points (in the present embodiment, three). The welding operation for the feed terminals 29*a*, 29*c* and the drive terminals 104A, 104C is similarly performed.
(Advantageous Effects of Fourth Embodiment)

According to the present embodiment, it is possible to obtain the following effects in addition to the effects obtained in the first embodiment to the third embodiment.

Namely, the present embodiment is configured so that, when the feed terminal 29 and the drive terminal 104 are seen in an overlapping direction of the feed terminal 29 and the drive terminal 104, the drive terminal 104 is seen behind the feed terminal 29. Therefore, when seen in the overlapping direction, a part of the drive terminal 104 is exposed from behind the feed terminal 29. As a result, when the feed terminal 29 and the drive terminal 104 are projection-welded together, it is possible to bring the main electrode bar 120*a* into abutment with the feed terminal 29 from forward in the overlapping direction, and, similarly to the main electrode bar 120*a*, to bring the sub electrode bar 120*b* into abutment with the exposed part of the drive terminal 104 from forward in the overlapping direction. Then, with a voltage being applied between the electrode bars 120*a*, 120*b* while the main electrode bar 120*a* is being pressed from forward to rearward in the overlapping direction, an electric current is passed between the electrode bars 120*a*, 120*b* via the feed terminal 29 and the drive terminal 104 while the feed terminal 29 is being pressed by the drive terminal 104. Therefore, it is possible to projection-weld the feed terminal 29 and the drive terminal 104 together. Thus, it is possible to projection-weld the feed terminal 29 and the drive terminal 104 together while the electrode bars 120*a*, 120*b* are in abutment with the feed terminal 29 and the drive terminal 104, respectively. Therefore, it is possible to improve the workability when the feed terminal 29 and the drive terminal 104 are joined together by projection welding. Furthermore, it is possible to perform welding by use of general-purpose electrode bars without using special-shaped electrode bars. Therefore, it is possible to prevent an increase in manufacturing costs.

Between the back of the drive terminal 104 and the motor drive unit 66, which is a constituent part of the control device 50, the clearance CL1 is provided. Therefore, it is possible to arrange a restraining jig 122, which restricts the movement of the feed terminal 29 and the drive terminal 104, behind the drive terminal 104. In addition, it is possible to secure the thickness of the restraining jig 122 in accordance with the clearance CL1 between the back of the drive terminal 104 and the motor drive unit 66. Therefore, it is possible to ensure the strength of the restraining jig 122. As a result, it is possible ensure enough pressing force when the feed terminal 29 and the drive terminal 104 are joined together by projection welding. Consequently, it is possible to strongly join the feed terminal 29 and the drive terminal 104 together by projection welding.

When the feed terminal 29 and the drive terminal 104 are joined together by projection welding, it is possible to bring the main electrode bar 120*a* into abutment with the feed terminal 29 from forward in the overlapping direction, and to bring the sub electrode bar 120*b* into abutment with the exposed part of the drive terminal 104 on the front end side from forward in the overlapping direction.

Furthermore, because the electric motor 70, which is capable of improving the workability when the projection-welding is performed, is provided, is it possible to form an electric pump 1 at a low cost.
(Modification of Fourth Embodiment)

Figure 16:
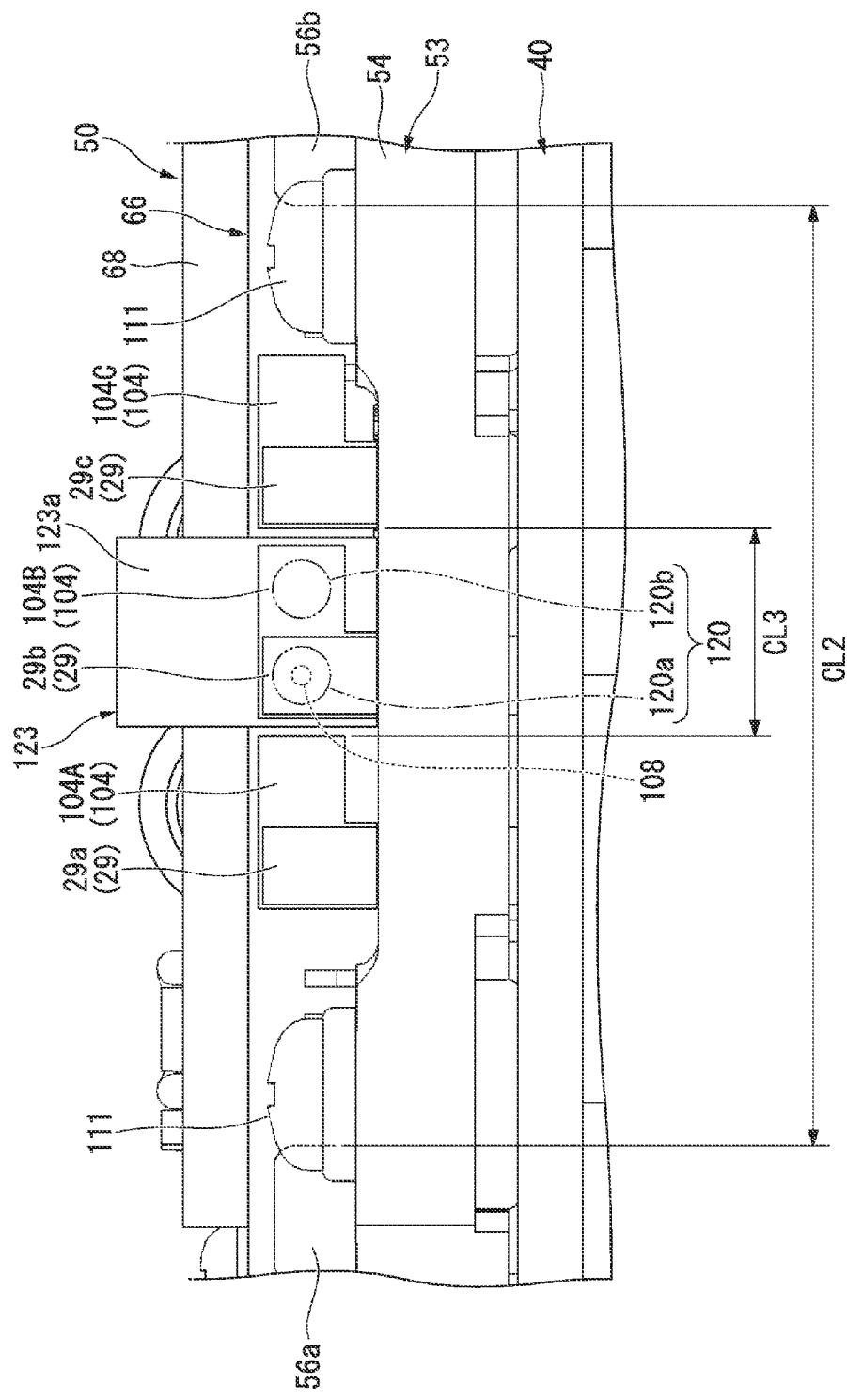
FIG. 16 is an explanatory diagram of terminals according to a modification of an embodiment when seen in an overlapping direction.

FIG. 16 is an explanatory diagram of terminals (feed terminals 29*a* to 29*c* and drive terminals 104A to 104C) according to a modification of the fourth embodiment when seen in an overlapping direction. FIG. 16 illustrates a case where the feed terminal 29*b* for V phase and the drive terminal 104B for V phase are welded together by use of a restraining jig 123 and a pair of electrode bars 120 (main electrode bar 120*a* and sub electrode bar 120*b*).

Next is a description of a method of welding and the terminals according to the modification of the fourth embodiment.

The fourth embodiment is configured so that, when the feed terminals 29 (29*a* to 29*c*) and the drive terminals 104 (104A to 104C) are seen in the overlapping direction, the drive terminals 104 can be seen on the front end side of the feed terminals 29 (see FIG. 15).

On the other hand, the modification of the fourth embodiment is different from the fourth embodiment in that, when the feed terminals 29 (29*a* to 29*c*) and the drive terminals 104 (104A to 104C) are seen in the overlapping direction, the drive terminals 104 can be seen on the outside of the feed terminal 29 in a width direction, as shown in FIG. 16. Detailed description of the constituent parts similar to those of the fourth embodiment will be omitted, and only different parts will be described.

Front ends of the drive terminals 104A to 104C are bent. As a result, when the feed terminals 29*a* to 29*c* and the drive terminals 104A to 104C are seen in the overlapping direction, the drive terminals 104A to 104C are exposed on the outside (the right side in FIG. 16) of the corresponding feed terminals 29*a* to 29*c* in the width direction.

From forward in the overlapping direction, the front end of the main electrode bar 120*a* is brought into abutment with the main surface of the feed terminal 29 (29*b* in FIG. 16) at a position corresponding to the protrusion section 108 of the drive terminal 104 (104B in FIG. 16). From forward in the overlapping direction, the front end of the sub electrode bar 120*b* is brought into abutment with the main surface of the drive terminal 104B that is exposed on the outside of the feed terminal 29*b*. At this time, the step surface 51*a*, which is formed between the collar members 57*c*, 57*d* on the first main surface 51 of the base unit 54, is configured to function also as an evacuation section that does not obstruct forward-rearward movements of the main electrode bar 120*a* and the sub electrode bar 120*b*. As a result, it is possible to bring the main electrode bar 120*a* and the sub electrode bar 120*b* into abutment with the main surface of the feed terminal 29*b* and with the drive terminal 104B, respectively, without contacting the base unit 54.

The restraining jig 123 of the present modification is arranged between the drive terminal 104B and the motor drive unit 66, in a state with a front surface 123*a* in the overlapping direction being in abutment with the drive terminal 104B. Furthermore, the dimension of the restraining jig 123 along the width direction is not more than a width dimension CL2 between a pair of protrusion sections 56*a*, 56*b* that are positioned on the side of the first bus bar opening 54*a* (see FIG. 5) and is less than a spaced distance CL3 between the drive terminal 104A and the drive terminal 104C. As a result, when the restraining jig 123 is arranged between the drive terminal 104B and the motor drive unit 66, it is possible to prevent the drive terminal 104A and the drive terminal 104C from interfering with the restraining jig 123.

Furthermore, only a single pair of main electrode bar 120*a* and sub electrode bar 120*b* are provided, and the welding operations on the feed terminals 29*a*, 29*c* and the drive terminals 104A, 104C are performed in a predetermined order.

(Advantageous Effects of Modification of Fourth Embodiment)

According to the modification of the fourth embodiment, when the feed terminal 29 and the drive terminal 104 are joined together by projection welding, it is possible to bring the main electrode bar 120*a* from forward in the overlapping direction into abutment with the feed terminal 29, and it is possible to bring the sub electrode bar 120*b* from forward in the overlapping direction into abutment with the exposed part of the drive terminal 104 on the outside in the width direction.

Furthermore, it is possible to make the restraining jig 123 smaller. This allows the restraining jig 123 to be simplified in shape. Furthermore, it is possible to reduce the number of electrode bars 120.

Embodiments of the present invention have been described above with reference to FIG. 1 to FIG. 16. However, the technical scope of this invention is not limited to the aforementioned embodiments. Various modifications can be made without departing from the spirit or scope of the invention.

Materials, shapes, and the like of the housing 10, the brushless motor 20, the control device 50, the noise prevention element 80, the pump unit 90, the bus bar 100, and the like are not limited to those of the embodiments. For example, the bus bar 100 may be made of aluminum. In addition, the housing 10 may be made of a metal material such as iron (carbon steel).

In the pump unit 90 of the first embodiment, the intake port 16 and the discharge port 17 are formed inside the bottom section 13 of the motor case 11. However, instead of being provided on the side of the motor case 11, the intake port 16 and the discharge port 17 may be provided on the side of the pump unit 90. To be more specific, the intake port 16 and the discharge port 17 may be formed in the pump cover 94 that covers the pump case 91.

The pump unit 90 of the first embodiment is a so-called trochoidal pump. However, the system of the pump is not limited to that of the first embodiment. For example, a non-positive-displacement-type regenerative pump with an impeller may be used.

In the embodiments, the connector unit 58 is erected along the axial direction and is led out to the outside of the housing 10. Instead, the connector unit 58 may be erected along the radial direction and led out to the outside of the housing 10. However, the embodiments are superior in that the dead space can be effectively utilized by arranging thereon the connector unit 58 while the electric motor 70 is prevented from being made larger in the radial direction.

In the embodiments, an O-ring is adopted as the sealing member 56 provided around the connector unit 58. However, the sealing member 56 is not limited to an O-ring. For example, the sealing member 56 may be made of a sheet-like rubber material or may be a liquid packing.

In the fourth embodiment and the modification of the fourth embodiment, the feed terminal 29 and the drive terminal 104 are joined together by projection welding. However, the welding method is not limited to projection welding. For example, so long as it is a method of welding while the electrode bar is being pressed against a terminal such as spot welding or seam welding, the present invention is applicable thereto. Furthermore, the fourth embodiment and the modification of the fourth embodiment are configured so that, when the feed terminal 29 and the drive terminal 104 are seen in the overlapping direction, the drive terminal 104 can be seen behind the feed terminal 29. However, the feed terminal 29 may be configured to be seen behind the drive terminal 104.

The fourth embodiment and the modification of the fourth embodiment are configured so that, of the drive terminals 104A to 104C, the drive terminal 104B is provided in a manner slightly offset to the motor drive unit 66 with respect to the drive terminals 104A, 104C so as to be electrically connectable to the feed terminal 29*b*. However, the drive terminals 104A to 104C may be provided laterally aligned without offsetting the drive terminal 104B.

Materials, shapes, and the like of the housing 10, the brushless motor 20, the control device 50, the noise prevention element 80, the pump unit 90, the bus bar 100, and the like are not limited to those of the embodiment. For example, the bus bar 100 may be made of aluminum. In addition, the housing 10 may be made of a metal material such as iron (carbon steel).

The pump unit 90 of the fourth embodiment is a so-called trochoidal pump. However, the system of the pump is not limited to that of the embodiment. For example, a non-positive-displacement-type regenerative pump with an impeller may be used.

In the fourth embodiment, the connector unit 58 is erected along the axial direction, and is led out to the side of the bottom section 13 of the housing 10. However, the connector unit 58 may be let out to the side opposite to the bottom section 13 of the housing 10.

The description has been for the case where the intake port 16 and the discharge port 17 are formed inside the bottom section 13 of the motor case 11. However, instead of being provided on the side of the motor case 11, the intake port 16 and the discharge port 17 may be provided on the side of the pump unit 90.

To be more specific, the intake port 16 and the discharge port 17 may be formed in the pump cover 94 that covers the pump case 91.

In other points, it is possible to appropriately replace the constituent elements of the aforementioned embodiments with known constituent elements without departing from the spirit or scope of the present invention.

INDUSTRIAL APPLICABILITY

According to the aforementioned electric motor, the motor drive unit is attached to the first surface of the base unit, and the motor control unit is attached to the second surface of the base unit. Therefore, it is possible to make the first surface and the second surface of the base unit smaller in area, and hence, to make the external shape of the base unit smaller than the case where the motor drive unit and the motor control unit are attached to only either one of the first surface and the second surface of the base unit. Furthermore, a plurality of bus bars are wired inside the base unit. Therefore, it is possible to make the external shape of the base unit smaller and make the base unit thinner than the case where, in the first surface and the second surface of the base unit, the bus bars are wired while circumventing the motor drive unit and the motor control unit. Accordingly, it is possible to make the electric motor smaller in the axial direction and the radial direction.

According to the aforementioned electric motor, the connector unit is led out to the outside through the through-hole of the housing, and the sealing member annularly arranged around the connector unit is sandwiched between the seal face and the housing. Therefore, it is possible to prevent the water, which has infiltrated from a gap between the connector unit and the through-hole, from moving outer than the sealing member. Consequently, it is possible to prevent water from infiltrating from the connector unit into the housing, and to ensure the waterproofness of the electric motor.

Furthermore, the aforementioned electric motor is configured so that, when the feed terminal and the drive terminal are seen in an overlapping direction of the feed terminal and the drive terminal, a first terminal of the feed terminal and the drive terminal is seen behind a second terminal. Therefore, when seen in the overlapping direction, a part of the first terminal is exposed from behind the second terminal. As a result, when the feed terminal and the drive terminal are resistance-welded together, it is possible to bring the first electrode bar into abutment with the second terminal from forward in the overlapping direction, and, similarly to the first electrode bar, to bring the second electrode bar into abutment with the exposed part of the first terminal from forward in the overlapping direction. Then, with a voltage being applied between the electrode bars while the first electrode bar is being pressed from forward to rearward in the overlapping direction, an electric current is passed between the electrode bars via both the terminals while the second terminal is being pressed by the first terminal. Therefore, it is possible to resistance-weld the second terminal and the first terminal together. Thus, it is possible to resistance-weld both the terminals together while the electrode bars are in abutment with the corresponding terminals, respectively. Therefore, it is possible to improve the workability when the second terminal and the first terminal are joined by resistance welding. Furthermore, it is possible to perform welding by use of general-purpose electrode bars without using special-shaped electrode bars. Therefore, it is possible to prevent an increase in manufacturing costs.

BRIEF DESCRIPTION OF THE REFERENCE SYMBOLS

1: electric pump
10: housing
11: motor case
20: brushless motor (motor unit)
21: stator
29, 29a, 29b, 29c: feed terminal
31: rotor
40: control device disposition section
42: flange section
43: through-hole
46: cover member
46a: through-hole
50: control device
51: first main surface (first surface)
52: second main surface (second surface)
53: bus bar unit main body
54: base unit
55: seal face
56: sealing member
57a, 57b: collar member (fixation device)
58: connector unit
66: motor drive unit (constituent part)
70: electric motor
71: motor control unit
80: noise prevention element
81: choke coil (noise prevention element)
87: X-capacitor (noise prevention element)
88: smoothing capacitor (noise prevention element)
90: pump unit
100: bus bar
104, 104A, 104B, 104C: drive terminal
111: bolt (fixation device)
CL1: clearance

The invention claimed is:

1. An electric motor, comprising:
a motor unit comprising a stator and a rotor, the stator being provided inside a motor case constituting a part of a housing, and the rotor being pivotally supported in a rotatable manner inside the stator in a radial direction; and
a control device that is coupled integrally to an end of the motor case in an axial direction,
wherein the control device comprises: a bus bar unit main body that has a base unit with a plurality of bus bars wired thereinside and has a connector unit provided integrally on the base unit;
a motor drive unit that drives the motor unit and
a motor control unit that controls the motor drive unit, and
wherein the motor drive unit is attached to a first surface of the base unit in the axial direction, and the motor control unit is attached to a second surface of the base unit in the axial direction,
wherein the housing has a through-hole provided at a position corresponding to the connector unit, and
wherein the connector unit is provided integrally on either one of the first surface and the second surface of the base unit, and is also erected along the axial direction and is led out to an outside of the housing through the through-hole.

2. The electric motor according to claim 1,
wherein, on the base unit, a seal face is formed around a base end of the connector unit,
wherein the connector unit is let out to the outside of the housing through the through-hole, and
wherein, between the seal face and the housing, a sealing member arranged annularly around the connector unit is sandwiched.

3. The electric motor according to claim 2,
wherein, on an outside of the sealing member of the base unit, fixation devices for fixing the bus bar unit main body to the housing are provided, and
wherein the fixation devices are uniformly arranged around the connector unit.

4. The electric motor according to claim 1,
wherein, on a surface opposite to the connector unit across the base unit, a noise prevention element that constitutes the control device is provided.

5. The electric motor according to claim 1,
wherein, at an end of the motor case on a first side in the axial direction, a control device disposition section for attachment of the control device is provided,
wherein a cover member, which constitutes a part of the housing and covers the control device disposition section from the first side in the axial direction, is comprised,
wherein, on the control device disposition section, a flange section that extends externally in the radial direction, is provided
wherein the connector unit is erected along the axial direction from the second surface of the base unit in the axial direction,
wherein, in the flange section, the through-hole is formed, and
wherein the connector unit is led out to the outside of the housing through the through-hole.

6. The electric motor according to claim 1,
wherein, at an end of the motor case on a first side in the axial direction, a control device disposition section for attachment of the control device is provided,
wherein a cover member, which constitutes a part of the housing and covers the control device disposition section from the first side in the axial direction, is comprised,
wherein the connector unit is erected along the axial direction from the first surface of the base unit in the axial direction,
wherein, in the cover member, the through-hole is formed, and
wherein the connector unit is let out to the outside of the housing through the through-hole.

7. The electric motor according to claim 5,
wherein the cover member is made of a metal material, and
wherein the motor drive unit is connected to the cover member.

8. The electric motor according to claim 1,
wherein a pump unit is coupled integrally to an end of the motor case on a second side in the axial direction to form an electric pump, and
wherein the electric motor functions as a drive source of the electric pump.

9. The electric motor according to claim 2,
wherein, at an end of the motor case on a first side in the axial direction, a control device disposition section for attachment of the control device is provided,
wherein a cover member, which constitutes a part of the housing and covers the control device disposition section from the first side in the axial direction, is comprised,
wherein, on the control device disposition section, a flange section that extends externally in the radial direction, is provided
wherein the connector unit is erected along the axial direction from the second surface of the base unit in the axial direction,
wherein, in the flange section, the through-hole is formed, and
wherein the connector unit is led out to the outside of the housing through the through-hole.

10. The electric motor according to claim 3,
wherein, at an end of the motor case on a first side in the axial direction, a control device disposition section for attachment of the control device is provided,
wherein a cover member, which constitutes a part of the housing and covers the control device disposition section from the first side in the axial direction, is comprised,
wherein, on the control device disposition section, a flange section that extends externally in the radial direction, is provided
wherein the connector unit is erected along the axial direction from the second surface of the base unit in the axial direction,
wherein, in the flange section, the through-hole is formed, and
wherein the connector unit is led out to the outside of the housing through the through-hole.

11. The electric motor according to claim 2,
wherein, at an end of the motor case on a first side in the axial direction, a control device disposition section for attachment of the control device is provided,
wherein a cover member, which constitutes a part of the housing and covers the control device disposition section from the first side in the axial direction, is comprised,
wherein the connector unit is erected along the axial direction from the first surface of the base unit in the axial direction,
wherein, in the cover member, the through-hole is formed, and
wherein the connector unit is led out to the outside of the housing through the through-hole.

12. The electric motor according to claim 3,
wherein, at an end of the motor case on a first side in the axial direction, a control device disposition section for attachment of the control device is provided,
wherein a cover member, which constitutes a part of the housing and covers the control device disposition section from the first side in the axial direction, is comprised,
wherein the connector unit is erected along the axial direction from the first surface of the base unit in the axial direction,
wherein, in the cover member, the through-hole is formed, and
wherein the connector unit is led out to the outside of the housing through the through-hole.

13. The electric motor according to claim 6,
wherein the cover member is made of a metal material, and
wherein the motor drive unit is connected to the cover member.

14. The electric motor according to claim 1,
wherein a pump unit is coupled integrally to an end of the motor case on a second side in the axial direction to form an electric pump, and
wherein the electric motor functions as a drive source of the electric pump.

15. The electric motor according to claim 2,
wherein a pump unit is coupled integrally to an end of the motor case on a second side in the axial direction to form an electric pump, and
wherein the electric motor functions as a drive source of the electric pump.

16. The electric motor according to claim 3,
wherein a pump unit is coupled integrally to an end of the motor case on a second side in the axial direction to form an electric pump, and
wherein the electric motor functions as a drive source of the electric pump.

17. The electric motor according claim 4,
wherein a pump unit is coupled integrally to an end of the motor case on a second side in the axial direction to form an electric pump, and
wherein the electric motor functions as a drive source of the electric pump.

\* \* \* \* \*